US012499535B2

(12) United States Patent
Halperin et al.

(10) Patent No.: US 12,499,535 B2
(45) Date of Patent: Dec. 16, 2025

(54) RETINAL DISEASE BIOMARKER PREDICTION BY STACKING SLICES OF 3D OCT IMAGE TO RESHAPE INTO 2D IMAGE AND APPLYING TRAINED FEATURE EXTRACTOR AND CNN

(71) Applicants: The Regents of the University of California, Oakland, CA (US); Doheny Eye Institute, Los Angeles, CA (US)

(72) Inventors: Eran Halperin, Santa Monica, CA (US); Nadav Rakocz, Los Angeles, CA (US); Jeffrey Chiang, Los Angeles, CA (US); Muneeswar Gupta, Los Angeles, CA (US); Srinivas Sadda, Los Angeles, CA (US)

(73) Assignees: The Regents of the University of California, Oakland, CA (US); Doheny Eye Institute, Los Angeles, CA (US)

( * ) Notice: Subject to any disclaimer, the term of this patent is extended or adjusted under 35 U.S.C. 154(b) by 413 days.

(21) Appl. No.: 17/758,625

(22) PCT Filed: Jan. 25, 2021

(86) PCT No.: PCT/US2021/014913
§ 371 (c)(1),
(2) Date: Jul. 11, 2022

(87) PCT Pub. No.: WO2021/151077
PCT Pub. Date: Jul. 29, 2021

(65) Prior Publication Data
US 2023/0045859 A1     Feb. 16, 2023

Related U.S. Application Data
(60) Provisional application No. 62/965,759, filed on Jan. 24, 2020.

(51) Int. Cl.
*G06T 7/00*     (2017.01)
*A61B 3/10*     (2006.01)
(Continued)

(52) U.S. Cl.
CPC ............ *G06T 7/0012* (2013.01); *A61B 3/102* (2013.01); *A61B 3/1225* (2013.01);
(Continued)

(58) Field of Classification Search
CPC ......... G06T 7/0012; G06T 2207/10101; G06T 2207/20081; G06T 2207/20084;
(Continued)

(56) References Cited

U.S. PATENT DOCUMENTS 8,712,505 B2 * 4/2014 Ishikawa ................ A61B 3/102
600/452
9,618,322 B2 * 4/2017 Jeglorz ................ G06V 20/653
(Continued)

FOREIGN PATENT DOCUMENTS

EP        4093289 A1    11/2022
WO   2017043679 A1    3/2017
(Continued)

OTHER PUBLICATIONS

Bhende et al. "Optical coherence tomography: A guide to interpretation of common macular diseases." Indian journal of ophthalmology 66.1 pp. 20-35. (Year: 2018).*
(Continued)

*Primary Examiner* — Scott A Rogers
(74) *Attorney, Agent, or Firm* — KPPB LLP

(57) ABSTRACT

Deep learning methods and systems for detecting biomarkers within optical coherence tomography volumes using such deep learning methods and systems are provided. Embodiments predict the presence or absence of clinically useful biomarkers in OCT images using deep neural net-
(Continued)

works. The lack of available training data for canonical deep learning approaches is overcome in embodiments by leveraging a large external dataset consisting of foveal scans using transfer learning. Embodiments represent the three-dimensional OCT volume by "tiling" each slice into a single two dimensional image, and adding an additional component to encourage the network to consider local spatial structure. Methods and systems, according to embodiments are able to identify the presence or absence of AMD-related biomarkers on par with clinicians. Beyond identifying biomarkers, additional models could be trained, according to embodiments, to predict the progression of these biomarkers over time.

8 Claims, 17 Drawing Sheets

(51) Int. Cl.
 *A61B 3/12* (2006.01)
 *A61B 5/00* (2006.01)
 *G16H 50/20* (2018.01)

(52) U.S. Cl.
 CPC .......... *A61B 5/6821* (2013.01); *A61B 5/7275* (2013.01); *G16H 50/20* (2018.01); *G06T 2207/10101* (2013.01); *G06T 2207/20081* (2013.01); *G06T 2207/20084* (2013.01); *G06T 2207/30041* (2013.01)

(58) Field of Classification Search
 CPC .......... G06T 2207/30041; A61B 3/102; A61B 3/1225; A61B 5/6821; A61B 5/7275; A61B 6/02; A61B 6/025; A61B 8/10; A61B 8/13; G16H 50/20
 See application file for complete search history.

(56) References Cited

U.S. PATENT DOCUMENTS

| | | | |
|---|---|---|---|
| 9,737,205 B2 | 8/2017 | Rubin et al. | |
| 10,098,533 B2* | 10/2018 | Chakravorty | G06V 40/193 |
| 10,722,180 B2* | 7/2020 | Zhang | G06N 3/045 |
| 10,963,737 B2 | 3/2021 | Odaibo et al. | |
| 11,857,358 B2* | 1/2024 | Liu | A61B 6/5241 |
| 2007/0258630 A1 | 11/2007 | Tobin et al. | |
| 2012/0184845 A1 | 7/2012 | Ishikawa et al. | |
| 2016/0174830 A1* | 6/2016 | Rubin | G06T 7/0012 351/246 |
| 2017/0169315 A1* | 6/2017 | Vaca Castano | G06V 10/25 |
| 2018/0068083 A1 | 3/2018 | Cohen et al. | |
| 2021/0264238 A1 | 8/2021 | Hare et al. | |
| 2021/0304358 A1* | 9/2021 | Song | G06T 3/4046 |
| 2021/0369195 A1* | 12/2021 | Russakoff | G16H 30/40 |
| 2024/0293024 A1* | 9/2024 | Hejrati | G16H 30/40 |
| 2024/0338864 A1* | 10/2024 | Chui | G06N 20/00 |

FOREIGN PATENT DOCUMENTS

| | | | |
|---|---|---|---|
| WO | 2020056454 A1 | 3/2020 | |
| WO | 2021132633 A1 | 7/2021 | |
| WO | 2021151077 A1 | 7/2021 | |
| WO | 2023081729 A1 | 5/2023 | |
| WO | 2024173602 A2 | 8/2024 | |
| WO | 2024173602 A3 | 10/2024 | |

OTHER PUBLICATIONS

Eladawi et al. "Classification of retinal diseases based on OCT images." Front Biosci 23.2 pp. 247-264. (Year: 2018).*
Saha et al. "Automated detection and classification of early AMD biomarkers using deep learning." Scientific reports 9:10990 (Year: 2019).*
Banerjee et al. "Prediction of age-related macular degeneration disease using a sequential deep learning approach on longitudinal SD-OCT imaging biomarkers." Scientific Reports 10:15434 (Year: 2020).*
Albarrak et al. "Age-related macular degeneration identification in volumetric optical coherence tomography using decomposition and local feature extraction." Proceedings of 2013 international conference on medical image, understanding and analysis. (Year: 2013).*
Rasti et al. "Automatic diagnosis of abnormal macula in retinal optical coherence tomography images using wavelet-based convolutional neural network features and random forests classifier." Journal of Biomedical Optics 23(3), 035005 (Year: 2018).*
Soomro et al., "UCF101: A Dataset of 101 Human Actions Classes from Videos in The Wild", arXiv:1212.0402v1 [cs.CV] Dec. 3, 2012, 7 pgs.
Szegedy et al., "Going Deeper with Convolutions", IEEE Conference on Computer Vision and Pattern Recognition (CVPR), Jun. 7-12, 2015, pp. 1-9, doi: 10.1109/CVPR.2015.7298594.
Tajbakhsh et al., "Embracing imperfect datasets: A review of deep learning solutions for medical image segmentation", Medical Image Analysis, vol. 6, 101693, Jul. 2020, published online Apr. 3, 2020, 26 pgs., doi: 10.1016/j.media.2020.101693, arXiv:1908.10454v1 [eess.IV] Aug. 27, 2019.
Tran et al., "A Closer Look at Spatiotemporal Convolutions for Action Recognition", IEEE/CVF Conference on Computer Vision and Pattern Recognition, CVPR 2018, Dec. 14, 2018, arXiv:1711.11248 [cs.CV], Apr. 12, 2018, 10 pgs.
Trout et al., "Relationship between abdominal fat stores and liver fat, pancreatic fat, and metabolic comorbidities in a pediatric population with non-alcoholic fatty liver disease", Abdominal Radiology, vol. 44, Jul. 16, 2019, pp. 3107-3114, doi: 10.1007/s00261-019-02123-y.
Virgili et al., "Optical coherence tomography (OCT) for detection of macular oedema in patients with diabetic retinopathy", Cochrane Database System Review, vol. 1, No. CD008081, Jan. 7, 2015, 45 pgs., doi: 10.1002/14651858.CD008081.pub3.
Wang et al., "Ten-year incidence and progression of age-related maculopathy: the blue Mountains Eye Study", Ophthalmology, vol. 114, No. 1, Jan. 2007, pp. 92-98, doi: 10.1016/j.ophtha.2006.07.017.
Witowski et al., "Improving breast cancer diagnostics with artificial intelligence for MRI", Science Translational Medicine, vol. 14, No. 664, eabo4802, Sep. 28, 2022, 23 pgs., doi: 10.1126/scitranslmed.abo4802.
Wong et al., "Global prevalence of age-related macular degeneration and disease burden projection for 2020 and 2040: a systematic review and meta-analysis", Lancet Global Health, vol. 2, No. 2, Feb. 2014, pp. e106-e116, published online Jan. 3, 2014, doi: 10.1016/S2214-109X(13)70145-1.
Yim et al., "Predicting conversion to wet age-related macular degeneration using deep learning", Nature Medicine, vol. 26, No. 6, Jun. 2020, Published May 18, 2020, pp. 892-899, doi: 10.1038/s41591-020-0867-7.
Yosinski et al., "Understanding Neural Networks Through Deep Visualization", arXiv:1506.06579v1 [cs.CV], Jun. 22, 2015, 12 pgs.
Zhuang et al., "A Comprehensive Survey on Transfer Learning", Proceedings of the IEEE, vol. 109, No. 1, Jan. 2021, pp. 1-34, doi: 10.1109/JPROC.2020.3004555.
Extended European Search Report for European Application No. 21744014.8, Search completed Jan. 26, 2024, Mailed Feb. 7, 2024, 12 pgs.
International Preliminary Report on Patentability for International Application PCT/US2021/014913, Report issued Jul. 26, 2022, Mailed Aug. 4, 2022, 6 pgs.
International Preliminary Report on Patentability for International Application PCT/US2022/079182, Report issued May 2, 2024, Mailed on May 16, 2024, 9 pgs.
International Search Report and Written Opinion for International Application No. PCT/US2021/014913, Search completed May 26, 2021, Mailed Jun. 24, 2021, 20 pgs.

(56) References Cited

OTHER PUBLICATIONS

International Search Report and Written Opinion for International Application No. PCT/US2022/079182, Search completed Jan. 30, 2023, Mailed Mar. 3, 2023, 17 pgs.
International Search Report and Written Opinion for International Application No. PCT/US2024/015861, Search completed Jun. 19, 2024, Mailed Jul. 18, 2024, 16 pgs.
"A Randomized, Placebo-Controlled, Clinical Trial of High-Dose Supplementation With Vitamins C and E, Beta Carotene, and Zinc for Age-Related Macular Degeneration and Vision Loss AREDS Report No. 8", Archives of Ophthalmology, vol. 119, No. 10, Oct. 2001, pp. 1417-1436, doi: 10.1001/archopht.119.10.1417.
"EchoNet-Dynamic: a Large New Cardiac Motion Video Data Resource for Medical Machine Learning", Stanford University, [retrieved on Oct. 8, 2024]. Retrieved from the Internet: <URL: https://echonet.github.io/dynamic/index.html>, 3 pgs.
"SLIViT: a general AI framework for clinical-feature diagnosis from limited 3D biomedical-imaging data", GitHub—berkindurmus, [retrieved on Oct. 8, 2024]. Retrieved from the Internet: <URL: https://github.com/berkindurmus/SLIViT?tab=readme-ov-file#slivit-a-general-ai-framework-for-clinical-feature-diagnosis-from-limited-3d-biomedical-imaging-data>, 6 pgs.
Apostolopoulos et al., "RetiNet: Automatic AMD Identification in OCT Volumetric Data", Arxiv (Cornell University), arXiv:1610.03628v1 [cs.CV] Oct. 12, 2016, 14 pgs., XP093123255, Ithaca, doi: 10.48550/arxiv.1610.03628. Retrieved from the Internet: URL: https://arxiv.org/pdf/1610.03628.pdf [retrieved on Jan. 24, 2024].
Argyriou et al., "Multi-Task Feature Learning", Advances in Neural Information Processing Systems, vol. 19, 2007, 8 pgs.
Bonekamp et al., "Spatial Distribution of MRI-Determined Hepatic Proton Density Fat Fraction in Adults With Nonalcoholic Fatty Liver Disease", Journal of Magnetic Resonance Imaging, vol. 39, No. 6, Jun. 2014, pp. 1525-1532, doi: 10.1002/jmri.24321.
Bycroft et al., "The UK Biobank resource with deep phenotyping and genomic data", Nature, vol. 562, Oct. 10, 2018, pp. 203-209, doi: 10.1038/s41586-018-0579-z.
Chen et al., "DCAN: Deep Contour-Aware Networks for Accurate Gland Segmentation", arXiv:1604.02677v1 [cs.CV] Apr. 10, 2016, 10 pgs.
Corradetti et al., "Natural history of incomplete retinal pigment epithelial and outer retinal atrophy in age-related macular degeneration", Canadian Journal of Ophthalmology, vol. 56, No. 5, Oct. 2021, pp. 325-334, doi: 10.1016/j.jcjo.2021.01.005.
Corvi et al., "Reproducibility of qualitative assessment of drusen volume in eyes with age related macular degeneration", Eye, vol. 35, Nov. 19, 2020, pp. 2594-2600, doi: 10.1038/s41433-020-01293-0.
Covarrubias et al., "Pilot study on longitudinal change in pancreatic proton density fat fraction during a weight-loss surgery program in adults with obesity", Journal of Magnetic Resonance Imaging, vol. 50, No. 4, Oct. 2019, pp. 1092-1102, doi: 10.1002/jmri.26671.
Cuenca et al., "Cellular Characterization of OCT and Outer Retinal Bands Using Specific Immunohistochemistry Markers and Clinical Implications", Ophthalmology, vol. 125, No. 3, Mar. 2018, published online Oct. 13, 2017, pp. 407-422, doi: 10.1016/j.ophtha.2017.09.016.
De Fauw et al., "Clinically applicable deep learning for diagnosis and referral in retinal disease", Nature Medicine, vol. 24, No. 9, Sep. 2018, published online Aug. 13, 2018, pp. 1342-1350, doi: 10.1038/s41591-018-0107-6.
Deng et al., "ImageNet: A Large-Scale Hierarchical Image Database", IEEE Conference on Computer Vision and Pattern Recognition, Jun. 20-25, 2009, pp. 248-255, doi: 10.1109/CVPR.2009.5206848.
Dörr et al., "Association of Retinal and Macular Damage with Brain Atrophy in Multiple Sclerosis", PLoS One, vol. 6, No. 4, e18132, Apr. 18, 2011, 6 pgs., doi: 10.1371/journal.pone.0018132.
Dosovitskiy et al., "An Image is Worth 16X16 Words: Transformers for Image Recognition at Scale", arXiv2010.11929 [cs.CV], Jun. 3, 2021, 22 pgs.
Dou et al., "Automatic Detection of Cerebral Microbleeds From MR Images via 3D Convolutional Neural Networks", IEEE Transactions on Medical Imaging, vol. 35, No. 5, May 2016, pp. 1182-1195, doi: 10.1109/TMI.2016.2528129.
Esteva et al., "A guide to deep learning in healthcare", Nature Medicine, vol. 25, No. 1, Jan. 7, 2019, pp. 24-29, doi: 10.1038/s41591-018-0316-z.
Esteva et al., "Dermatologist-level classification of skin cancer with deep neural networks", Nature, vol. 542, No. 7639, Feb. 2, 2017, pp. 115-118, published online Jan. 25, 2017, doi: 10.1038/nature21056.
Ferris et al., "Clinical Classification of Age-related Macular Degeneration", Ophthalmology, vol. 120, No. 4, Apr. 2013, pp. 844-851, doi: 10.1016/j.ophtha.2012.10.036.
Filho et al., "Outer Retinal Layers as Predictors of Vision Loss", Review of Ophthalmology, printed from https://www.reviewofophthalmology.com/article/outer-retinal-layers-as-predictors-of-vision-loss, Published on Apr. 15, 2015, 8 pgs.
Ghorbani et al., "Deep learning interpretation of echocardiograms", Nature Partner Journals, Digital Medicine, vol. 3, No. 10, Jan. 24, 2020, 10 pgs., doi: 10.1038/s41746-019-0216-8.
Greenspan et al., "Guest Editorial Deep Learning in Medical Imaging: Overview and Future Promise of an Exciting New Technique", IEEE Transactions on Medical Imaging, vol. 35, No. 5, May 2016, pp. 1153-1159, doi: 10.1109/TMI.2016.2553401.
Grewal et al., "Diagnosis of glaucoma and detection of glaucoma progression using spectral domain optical coherence tomography", Current Opinion in Ophthalmology, vol. 24, No. 2, Mar. 2013, pp. 150-161, doi: 10.1097/ICU.0b013e32835d9e27.
Gulshan et al, "Development and validation of a deep learning algorithm for detection of diabetic retinopathy in retinal fundus photographs", Journal of the American Medical Association, vol. 316, No. 22, Dec. 13, 2016, pp. 2402-2410, doi: 10.1001/jama.2016.17216.
Hannun et al., "Cardiologist-level arrhythmia detection and classification in ambulatory electrocardiograms using a deep neural network", Nature Medicine, vol. 25, No. 1, Jan. 2019, pp. 65-69, doi: 10.1038/s41591-018-0268-3.
Hara, "Analysis of function of rectified linear unit used in deep learning", International Joint Conference on Neural Networks, Jul. 12-17, 2015, 8 pgs., doi: 10.1109/IJCNN.2015.7280578.
Hara et al., "Can Spatiotemporal 3D CNNs Retrace the History of 2D CNNs and ImageNet?", arXiv:1711.09577v2 [cs.CV] Apr. 2, 2018, 10 pgs.
Hastie et al., "The Elements of Statistical Learning Data Mining, Inference, and Prediction", Book Review, Springer-Verlag, New York, 2004, vol. 23, pp. 527-530.
Hastie et al., "The Elements of Statistical Learning Data Mining, Inference, and Prediction", Springer-Verlag New York, 2nd Edition, 2009, 764 pgs., doi: 10.21236/ad0256582.
He et al., "Deep residual learning for image recognition", arXiv:1512.03385 [cs.CV] Dec. 10, 2015, IEEE Conference on Computer Vision and Pattern Recognition, Dec. 10, 2015, pp. 1-12.
Ho et al., "Documentation of Intraretinal Retinal Pigment Epithelium Migration via High-Speed Ultrahigh-Resolution Optical Coherence Tomography", Ophthalmology, vol. 118, No. 4, Apr. 2011, pp. 687-693, doi: 10.1016/j.ophtha.2010.08.010.
Howard et al., "Fastai: A Layered API for Deep Learning", Information, vol. 11, No. 2, 2020, 26 pgs., doi: 10.3390/info11020108.
Huang et al., "Lung nodule detection in CT using 3D convolutional neural networks", 14th IEEE International Symposium on Biomedical Imaging (ISBI), Melbourne, Australia, Apr. 18-21, 2017, pp. 379-383, doi: 10.1109/ISBI.2017.7950542.
Idilman et al., "Proton density fat fraction: magnetic resonance imaging applications beyond the liver", Diagnostic and Interventional Radiology, vol. 28, No. 1, Jan. 2022, pp. 83-91, doi: 10.5152/dir.2021.21845.
Jiang et al., "AHCNet: An Application of Attention Mechanism and Hybrid Connection for Liver Tumor Segmentation in CT Volumes", IEEE Access, vol. 7, Feb. 25, 2019, pp. 24898-24909, doi: 10.1109/ACCESS.2019.2899608.

(56) References Cited

OTHER PUBLICATIONS

Jin et al., "A deep 3D residual CNN for false-positive reduction in pulmonary nodule detection", Medical Physics, vol. 45, No. 5, May 2018, Published online Mar. 25, 2018, pp. 2097-2107, doi: 10.1002/mp.12846.
Jung et al., "Direct Comparison of Quantitative US versus Controlled Attenuation Parameter for Liver Fat Assessment Using MRI Proton Density Fat Fraction as the Reference Standard in Patients Suspected of Having NAFLD", Radiology, vol. 304, No. 1, Jul. 2022, pp. 75-82, doi: 10.1148/radiol.211131.
Kah, "CuRRL Syndrome: A Case Series", Acta Scientific Ophthalmology, vol. 1, No. 3, Nov. 5, 2018, pp. 9-13.
Kamnitsas et al., "Efficient multi-scale 3D CNN with fully connected CRF for accurate brain lesion segmentation", Medical Image Analysis, vol. 36, Feb. 2017, pp. 61-78, doi: 10.1016/j.media.2016.10.004.
Karri et al., "Transfer Learning Based Classification of Optical Coherence Tomography Images with Diabetic Macular Edema and Dry Age-Related Macular Degeneration", Biomedical Optics Express, vol. 8, No. 2, Jan. 4, 2017, pp. 579-592, XP055824275, United States ISSN: 2156-7085, doi: 10.1364/BOE.8.000579.
Keane et al., "Evaluation of Age-related Macular Degeneration With Optical Coherence Tomography", Survey of Ophthalmology, vol. 57, No. 5, Sep.-Oct. 2012, pp. 389-414, doi: 10.1016/j.survophthal.2012.01.006.
Kermany et al., "Identifying Medical Diagnoses and Treatable Diseases by Image-Based Deep Learning", Cell, vol. 172, No. 5, Feb. 22, 2018, pp. 1122-1131, doi: 10.1016/j.cell.2018.02.010.
Kingma et al., "Adam: A Method for Stochastic Optimization", arXiv.org, Retrieved from: https://arxiv.org/abs/1412.6980v1 [cs.LG], Dec. 22, 2014, 9 pgs.
Kiranyaz et al., "1D Convolutional Neural Networks and Applications: A Survey", Mechanical Systems and Signal Processing, vol. 151, No. 107398, Apr. 2021, 21 pgs., doi: 10.1016/j.ymssp.2020.107398.
Krizhevsky et al., "ImageNet Classification with Deep Convolutional Neural Networks", Advances in Neural Information Processing Systems (NIPS), vol. 25, 2012, pp. 1097-1105.
Kuhn et al., "Pancreatic Steatosis Demonstrated at MR Imaging in the General Population: Clinical Relevance", Radiology, vol. 276, No. 1, Feb. 5, 2015, pp. 129-136, doi: 10.1148/radiol.15140446.
Kurmann et al., "Fused Detection of Retinal Biomarkers in OCT Volumes", Medical Image Computing and Computer Assisted Intervention—MICCAI 2019: 22nd International Conference, Shenzhen, China, Oct. 13-17, 2019, Proceedings, Part I, pp. 255-263, doi: 10.1007/978-3-030-32239-7_29.
Lecun et al., "Gradient-Based Learning Applied to Document Recognition", Proceedings of the IEEE, vol. 86, No. 11, Nov. 1998, pp. 2278-2324, doi: 10.1109/5.726791.
Lee et al., "Automated Characterization of Pigment Epithelial Detachment by Optical Coherence Tomography", Investigative Ophthalmology & Visual Science, vol. 53, Jan. 2012, pp. 164-170, doi: 10.1167/iovs.11-8188.
Lei et al., "Proposal of a simple optical coherence tomography-based scoring system for progression of age-related macular degeneration", Graefe's Archival for Clinical Experimental Ophthalmology, vol. 225, May 22, 2017, pp. 1551-1558, doi: 10.1007/s00417-017-3693-y.
Liu et al., "A ConvNet for the 2020s", arXiv:2201.03545v2 [cs.CV] Mar. 2, 2022, 15 pgs.
Mckinney et al., "International evaluation of an AI system for breast cancer screening", Nature, vol. 577, No. 7788, 2020, pp. 89-94, doi: 10.1038/s41586-019-1799-6.
Milletari et al., "V-Net: Fully Convolutional Neural Networks for Volumetric Medical Image Segmentation", Fourth International Conference on 3D Vision, Oct. 2016, pp. 565-571, doi: 10.1109/3DV.2016.79.
Mooney, "Retinal OCT Images (optical coherence tomography)", Kaggle, [retrieved on Oct. 8, 2024]. Retrieved from the Internet: <URL: https://www.kaggle.com/datasets/paultimothymooney/kermany2018>, 1 pg.
Nassisi et al., "OCT Risk Factors for Development of Late Age-Related Macular Degeneration in the Fellow Eyes of Patients Enrolled in the HARBOR Study", Ophthalmology, vol. 126, No. 12, Dec. 2019, pp. 1667-1674, doi: 10.1016/j.ophtha.2019.05.016.
Nittala et al., "Amish Eye Study: Baseline Spectral Domain Optical Coherence Tomography Characteristics of Age-Related Macular Degeneration", Retina, vol. 39, No. 8, Aug. 2019, pp. 1540-1550, doi: 10.1097/IAE.0000000000002210.
Nittala et al., "Changes in Retinal Layer Thickness in the Contralateral Eye of Patients with Unilateral Neovascular Age-Related Macular Degeneration", Ophthalmology Retina, vol. 3, No. 2, Feb. 3, 2019, published online Sep. 27, 2018, pp. 112-121, doi: 10.1016/j.oret.2018.09.017.
O'Shea et al., "An Introduction to Convolutional Neural Networks", arXiv:1511.08458 [cs.NE] Dec. 2, 2015, 11 pgs.
Oquab et al., "Learning and Transferring Mid-Level Image Representations Using Convolutional Neural Networks", IEEE Conference on Computer Vision and Pattern Recognition, Jun. 2014, pp. 1717-1724, doi: 10.1109/CVPR.2014.222.
Ouyang et al., "EchoNet-Dynamic: a Large New Cardiac Motion Video Data Resource for Medical Machine Learning", 33rd Conference on Neural Information Processing Systems (NeurIPS 2019), Vancouver, Canada, 2019, 11 pgs.
Ouyang et al., "Optical Coherence Tomography-Based Observation of the Natural History of Drusenoid Lesion in Eyes with Dry Age-related Macular Degeneration", Ophthalmology, vol. 120, No. 12, Dec. 2013, pp. 2656-2665, doi: 10.1016/j.ophtha.2013.05.029.
Pan et al., "A Survey on Transfer Learning", IEEE Transactions on Knowledge and Data Engineering, vol. 22, No. 10, Oct. 2010, pp. 1345-1359, doi: 10.1109/TKDE.2009.191.
Patel et al., "Insulin Resistance Increases MRI-Estimated Pancreatic Fat in Nonalcoholic Fatty Liver Disease and Normal Controls", Gastroenterology Research and Practice, vol. 2013, Article 498296, 2013, 8 pgs., doi: 10.1155/2013/498296.
Pedregosa et al., "Scikit-learn: Machine Learning in Python", Journal of Machine Learning Research, vol. 12, Oct. 2011, pp. 2825-2830.
Pinkus, "Approximation theory of the MLP model in neural networks", Acta Numerica, vol. 8, Jan. 1999, pp. 143-195, doi: 10.1017/S0962492900002919.
Pratt, "Discriminability-Based Transfer between Neural Networks", Advances in Neural Information Processing Systems, vol. 5, Nov. 30, 1992, pp. 204-211.
Rajpurkar et al., "Deep learning for chest radiograph diagnosis: a retrospective comparison of the cheXneXt algorithm to practicing radiologists", Public Library of Science Medicine, vol. 15, No. 11, 2018, e1002686, 17 pgs., doi: 10.1371/journal.pmed.1002686.
Rakocz et al., "Automated Identification of Clinical Features from Sparsely Annotated 3-Dimensional Medical Imaging", NPJ Digital Medicine, vol. 4, No. 44, Mar. 8, 2021, 13 pgs., doi: 10.1038/s41746-021-00411-w.
Rawat et al., "Deep Convolutional Neural Networks for Image Classification: A Comprehensive Review", Neural Computation, vol. 29, No. 9, Sep. 2017, pp. 2352-2449, doi: 10.1162/neco_a_00990.
Redekop et al., "Attention-Guided Prostate Lesion Localization and Grade Group Classification with Multiple Instance Learning", Proceedings of the 5th International Conference on Medical Imaging with Deep Learning, Proceedings of Machine Learning Research (PMLR), vol. 172, 2022, pp. 975-987.
Roizenblatt et al., "The Question of a Role for Statins in Age-Related Macular Degeneration", International Journal of Molecular Sciences, vol. 19, No. 11, Article 3688, Nov. 21, 2018, 15 pgs., doi: 10.3390/ijms19113688.
Roth et al., "Improving Computer-Aided Detection Using Convolutional Neural Networks and Random View Aggregation", IEEE Transactions on Medical Imaging, vol. 35, No. 5, May 2016, Published online Sep. 28, 2015, pp. 1170-1181, doi: 10.1109/TMI.2015.2482920.

(56) References Cited

OTHER PUBLICATIONS

Runge et al., "MR Spectroscopy-derived Proton Density Fat Fraction Is Superior to Controlled Attenuation Parameter for Detecting and Grading Hepatic Steatosis", Radiology, vol. 286, No. 2, Sep. 15, 2017, pp. 547-556, doi: 10.1148/radiol.2017162931.

Russakovsky et al., "ImageNet Large Scale Visual Recognition Challenge", International Journal of Computer Vision, vol. 115, No. 3, Dec. 2015, pp. 211-252, doi: 10.1007/s11263-015-0816-y.

Schawkat et al., "Preoperative Evaluation of Pancreatic Fibrosis and Lipomatosis: Correlation of Magnetic Resonance Findings With Histology Using Magnetization Transfer Imaging and Multigradient Echo Magnetic Resonance Imaging", Investigative Radiology vol. 53, No. 12, Dec. 2018, pp. 720-727, doi: 10.1097/RLI.0000000000000496.

Sherman, "Photoreceptor integrity line joins the nerve fiber layer as key to clinical diagnosis", Optometry—Journal of the American Optometric Association, vol. 80, No. 6, Jun. 2009, pp. 277-278, doi: 10.1016/j.optm.2008.12.006.

Sherman et al., "The ABCs of OCT", Review of Optometry, printed from https://.review ofoptometry.com/article/the-abcs-of-oct, Published on Sep. 15, 2012, 6 pgs.

Shin et al., "Deep Convolutional Neural Networks for Computer-Aided Detection: CNN Architectures, Dataset Characteristics and Transfer Learning", IEEE Transactions on Medical Imaging, vol. 35, No. 5, May 2016, pp. 1285-1298, doi: 10.1109/TMI.2016.2528162.

Shorten et al., "A survey on Image Data Augmentation for Deep Learning", Journal of Big Data, vol. 6, No. 60, Jul. 2019, 48 pgs., doi: 10.1186/s40537-019-0197-0.

Smith, "Cyclical Learning Rates for Training Neural Networks", 2017 IEEE Winter Conference on Applications of Computer Vision (WACV), Mar. 24-31, 2017, pp. 464-472.

Smith et al., "Super-Convergence: Very Fast Training of Neural Networks Using Large Learning Rates", arXiv:1708.07120v3 [cs.LG], May 17, 2018, 18 pgs.

Goh et al., "Hyporeflective Cores within Drusen: Association with Progression of Age-Related Macular Degeneration and Impact on Visual Sensitivity", Ophthalmology Retina, vol. 6, No. 4, Apr. 2022, pp. 284-290, doi: 10.1016/j.oret.2021.11.004.

He et al., "Deep Residual Learning for Image Recognition", arXiv:1512.03385v1 [cs.CV], Dec. 10, 2015, 12 pgs.

Lim et al., "Age-related macular degeneration", Ophthalmology, vol. 379, No. 9827, May 5, 2012, pp. 1728-1738.

Paszke et al., "PyTorch: An Imperative Style, High-Performance Deep Learning Library", Advances in Neural Information Processing Systems 32, 2019, pp. 8024-8035.

\* cited by examiner

| Biomarker | Prevalence |
|---|---|
| Intraretinal hyperreflective feature over drusen | 6.28% |
| Intraretinal hyperreflective feature over non drusen | 4.90% |
| Intraretinal cystoid spaces | 2.53% |
| Drusenoid pigment epithelial detachment (PED) | 13.56% |
| Subretinal tissue | 0.38% |
| Subretinal drusenoid deposits | 2.15% |

*FIG. 5*

| Model | ROC | PR |
|---|---|---|
| *SRTSRHRM* | | |
| Pre trained Tile Model | 0.78[0.553,0.982] | 0.53[0.262,0.790] |
| Tile Model from Scratch | 0.93[0.812,0.990] | 0.37[0.201,0.677] |
| SlicePooling Model | 0.99[0.977,0.994] | 0.52[0.295,0.784] |
| SlicePooling Model from scratch | 0.99[0.971,0.996] | 0.69[0.455,0.885] |
| 3D CNN | 0.97[0.954,0.986] | 0.30[0.162,0.546] |
| *INTRA_RCS* | | |
| Pre trained Tile Model | 0.92[0.841,0.981] | 0.73[0.556,0.857] |
| Tile Model from Scratch | 0.82[0.715,0.912] | 0.30[0.170,0.512] |
| SlicePooling Model | 0.93[0.841,0.990] | 0.79[0.635,0.910] |
| SlicePooling Model from scratch | 0.87[0.790,0.933] | 0.31[0.182,0.523] |
| 3D CNN | 0.86[0.770,0.928] | 0.29[0.156,0.480] |
| *SR_DRUSEN* | | |
| Pre trained Tile Model | 0.46[0.232,0.692] | 0.11[0.009,0.380] |
| Tile Model from Scratch | 0.85[0.734,0.941] | 0.09[0.036,0.228] |
| SlicePooling Model | 0.94[0.887,0.975] | 0.17[0.081,0.336] |
| SlicePooling Model from scratch | 0.95[0.927,0.974] | 0.20[0.080,0.458] |
| 3D CNN | 0.96[0.924,0.981] | 0.23[0.107,0.473] |
| *HRF_IRHRFOND* | | |
| Pre trained Tile Model | 0.96[0.923,0.987] | 0.65[0.504,0.818] |
| Tile Model from Scratch | 0.95[0.901,0.987] | 0.65[0.493,0.810] |
| SlicePooling Model | 0.98[0.967,0.992] | 0.80[0.662,0.905] |
| SlicePooling Model from scratch | 0.92[0.847,0.974] | 0.53[0.385,0.710] |
| 3D CNN | 0.97[0.935,0.986] | 0.68[0.526,0.837] |
| *HRF_HRFOD* | | |
| Pre trained Tile Model | 0.79[0.701,0.871] | 0.43[0.295,0.587] |
| Tile Model from Scratch | 0.95[0.922,0.977] | 0.65[0.492,0.782] |
| SlicePooling Model | 0.98[0.969,0.989] | 0.71[0.570,0.841] |
| SlicePooling Model from scratch | 0.96[0.932,0.975] | 0.55[0.422,0.724] |
| 3D CNN | 0.95[0.910,0.976] | 0.62[0.468,0.761] |
| *PED_DPED* | | |
| Pre trained Tile Model | 0.85[0.788,0.899] | 0.70[0.614,0.777] |
| Tile Model from Scratch | 0.82[0.765,0.883] | 0.62[0.523,0.729] |
| SlicePooling Model | 0.93[0.896,0.960] | 0.79[0.713,0.862] |
| SlicePooling Model from scratch | 0.87[0.818,0.919] | 0.60[0.490,0.724] |
| 3D CNN | 0.82[0.762,0.873] | 0.52[0.418,0.637] |

*FIG. 10*

|  | 3D CNN | Tile-RESNET | SLIVER-net |
|---|---|---|---|
| Preprocessing | Slicing and contrast stretch 51 slices of 224 x 224 pixels | | |
| Abstract feature extraction | 3D Resnet18 8 x 8 x ◊ x 512 | 2D Resnet18 (51 x 8) x 8 x 512 | 2D Resnet18 (51 x 8) x 8 x 512 |
| Slice aggregation | 3D Global Adaptive average pooling 1 x 1024 | 2d Global Adaptive Average pooling 1 x 1024 | Slice-Integration 51 x 1024 + 1D CNN 12 x 32 |
| Biomarker prediction | Flattening + Fully connected | | |

FIG. 12

RETINAL DISEASE BIOMARKER PREDICTION BY STACKING SLICES OF 3D OCT IMAGE TO RESHAPE INTO 2D IMAGE AND APPLYING TRAINED FEATURE EXTRACTOR AND CNN

CROSS-REFERENCE TO RELATED APPLICATIONS

The current application is a national stage application of PCT Application No. PCT/US21/14913, entitled "Biomarker Prediction Using Optical Coherence Tomography" to Halperin et al., filed Jan. 25, 2021, which claims the benefit of and priority to U.S. Provisional Patent Application No. 62/965,759 entitled "Biomarker Prediction Using Optical Coherence Tomography" to Halperin et al., filed Jan. 24, 2020, the disclosures of which are hereby incorporated by reference in their entireties.

STATEMENT REGARDING FEDERALLY SPONSORED RESEARCH

This invention was made with government support under Grant Numbers 1705197 and HG010505, awarded by the National Institutes of Health. The government has certain rights in the invention.

FIELD OF THE INVENTION

The current disclosure is directed to deep learning methods and systems capable of capturing 3D information from 2D images; and more particularly to methods and systems for detecting biomarkers within optical coherence tomography volumes using such deep learning methods and systems.

BACKGROUND

Optical Coherence Tomography (OCT) is an integral component of ophthalmic clinical practice. Because of its high axial resolution and near histology level detail, OCT provides an excellent method to assess the integrity of the retinal layers in a variety of conditions including optic nerve disorders, retinal diseases, and systemic conditions which may have ocular manifestations. (See, e.g., Epshtein, Sherman, Optometry—Journal of the American Optometric Association 80, 277-278 (2009); Cuenca, N., et al, Ophthalmology 125, 407-422 (2018); Grewal, D. & Tanna, A., Curr. Opin. Ophthalmol. 24, 150-161 (2013); Keane, P. A. et al., Surv. Ophthalmol. 57, 389-414 (2012); Virgili, G. et al., Cochrane Database Syst. Rev. 1, CD008081 (2015); Dörr, J. et al., PLoS One 6, (2011); and Kah, T. A., CuRRL Syndrome: A Case Series. 5 (2018), the disclosures of which are incorporated herein by reference.) OCT has been particularly transformative in the management of age-related macular degeneration (AMD), the leading cause of blindness in developed nations.

A number of OCT risk factors for progression to late AMD have been defined. Initially, AMD may manifest by the development of drusen, which are accumulations of material under the retinal pigment epithelium (RPE). Vision may be relatively good at this early or intermediate dry phase of the disease. Eventually, a significant number of patients progress to the development of macular neovascularization (MNV) and/or geographic atrophy (GA), which are considered the late manifestations of the disease, and may be associated with considerable loss of vision. Effective treatments (anti-vascular endothelial growth factor, or anti-VEGF) have been developed for MNV, but thus far, there is no treatment for GA. In addition, despite the availability of treatments for MNV, many "successfully" treated patients eventually go on to develop atrophy and vision loss. In addition, the best outcomes for treatment of active MNV are observed in patients who are treated early on while the neovascular lesions are small. As such, early detection and treatment of MNV is important, and identifying patients who are at high-risk for progression to late AMD is essential in order to identify appropriate intervals for routine monitoring of patients with earlier stages of AMD. A number of OCT risk factors for progression to late AMD have been defined. These include intraretinal hyperreflective foci (which are thought to represent migration of RPE into the retina), hyporeflective cores within drusen, subretinal drusenoid deposits, and high central drusen volume. Recently, a system for integrating these factors into a score which could reflect a given patient's risk for conversion to late AMD has been proposed. This system is later validated in a post-hoc analysis of intermediate dry AMD eyes enrolled into the HARBOR study.

However, detection of these risk factors requires careful inspection of the B-scans in the OCT volume obtained during the evaluation of patients with dry AMD. The reliability of clinicians for detecting these factors and generating an accurate risk score in the context of a busy clinical practice, remains to be established. Ideally, these risk factors for progression would be detected automatically from the OCT, which would allow a risk score to be immediately available to the clinician.

The application of deep learning, specifically Convolutional Neural Networks (CNNs) to medical images has proven to be successful for detecting and predicting disease. (See, e.g., Greenspan, H., et al., IEEE Trans. Med. Imaging 35, 1153-1159 (2016); Roth, H. R. et al., IEEE Trans. Med. Imaging 35, 1170-1181 (05 2016); Qi Dou, N. et al., IEEE Trans. Med. Imaging 35, 1182-1195 (05 2016); Tajbakhsh, N. et al., Embracing Imperfect Datasets: A Review of Deep Learning Solutions for Medical Image Segmentation. arXiv: 1908.10454 (2019); and Kermany, D. S. et al., Cell 172, 1122-1131.e9 (2018), the disclosures of which are incorporated herein by reference.) Recent applications to OCT images have focused on predicting glaucoma, AMD, and other diseases.

These advances follow a general pattern. First, machine learning methods are applied to a novel task, which is enabled by the acquisition and/or release of a sufficiently large dataset. Then, subsequent innovations stem from addressing technical challenges unique to medical images. Thus far, the availability of sufficiently available data has stunted the widespread application of machine learning for clinical purposes in the context of OCT interpretation.

BRIEF SUMMARY

Methods and systems in accordance with various embodiments of the invention utilize deep learning to capture three-dimensional (3D) information from two-dimensional (2D) images, and to detect irregularities in 3D images. Examples of 3D images that can be analyzed include (but not limited to): optical coherence tomography, and magnetic resonance imaging. Several embodiments can detect biomarkers within optical coherence tomography (OCT) volumes using deep learning methods and systems. Many embodiments can detect retinal disease related biomarkers from OCT images. Several embodiments provide diagnosis and treatment of retinal diseases including (but not limited to) age-related macular degeneration (AMD), AMD subtypes, AMD progression, and/or AMD deterioration based on the biomarker detection.

Some embodiments can detect the presence and/or absence of clinically useful biomarkers in OCT images using deep neural networksOne embodiment of the invention includes a method to predict retinal disease biomarkers comprising:

obtaining at least one three-dimensional optical coherent tomography image using a computer system;
reshaping the three-dimensional optical coherent tomography image into a two-dimensional image by stacking a plurality of slices of said three-dimensional image on top of one another using the computer system;
applying a pre-trained feature extractor, wherein the pre-trained feature extractor independently operates on each of the plurality of slices;
applying a convolutional neural network operating across the plurality of slices, wherein the convolutional neural network produces a feature vector; and
generating an output of biomarker prediction, wherein the prediction is a transformation of the feature vector.

In a further embodiment, the final output is at least one biomarker predictive of age-related macular degeneration (AMD), AMD subtype, AMD progression, or AMD deterioration.

In an additional embodiment, the AMD subtype is selected from the group consisting of early AMD, intermediate AMD, wet AMD, and geographic atrophy.

In another embodiment, the at least one biomarker is intraretinal hyperreflective feature over drusen, intraretinal hyperreflective feature over non drusen, intraretinal cystoid spaces, drusenoid pigment epithelial detachment, subretinal tissue, subretinal drusenoid deposits, incomplete retinal pigment epithelial and outer retinal atrophy (iRORA), complete retinal pigment epithelial and outer retinal atrophy (cRORA), and any combinations thereof.

In a still further embodiment, the method further comprising slice pooling by sampling a mean value and a maximum value from every slice.

In still another embodiment, the convolutional neural network is a 1D convolutional neural network.

In yet another embodiment, feature vector transformation is a decision layer comprising at least two fully connected layers.

In a yet further embodiment, the layers are connected with a rectified linear unit between each layer.

Still another additional embodiment includes a method of training a feature extractor model to predict at least one retinal disease biomarker comprising:

obtaining a training dataset of images using a computer system;
generating a first set of features for each image in the training dataset based upon either object classification or disease identification using the computer system;
training a feature extractor model to learn relationships between the set of images in the training dataset and the first set of features in the training dataset using the computer system; and
utilizing the feature extractor model to predict at least one biomarker predictive of a retinal disease.

In a still further embodiment, the method further comprising:

obtaining an annotated training dataset of optical coherent tomography images using the computer system, wherein the images are annotated with at least one retinal disease;
generating a second set of features for each annotated image in the training dataset using the computer system; and
training the feature extractor model to learn relationships between the set of annotated images in the annotated training dataset and the second set of features in the annotated training dataset using the computer system.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein:

FIG. 5 provides a table of and the prevalence of different AMD-related biomarkers in accordance with an embodiment of the invention.

FIG. 10 provides a table summarizing the data of different prediction models in accordance with an embodiment of the invention.

FIG. 12 provides a table summarizing candidate models for biomarker prediction where the input to each model Is the same set of OCT images, and passes through different subsequent layers with implications for spatial representation in accordance with an embodiment of the invention.

DETAILED DESCRIPTION

Figure 1:
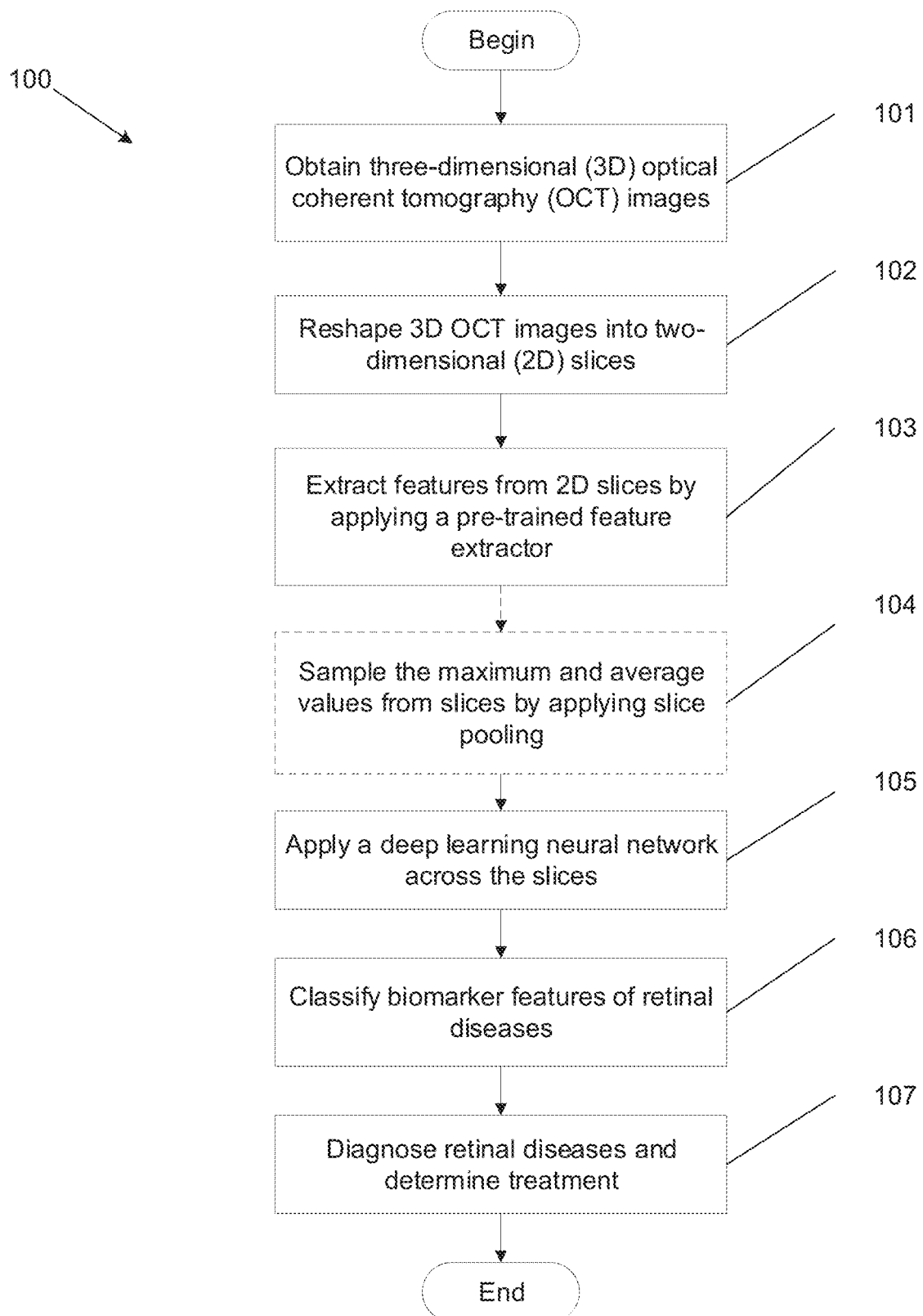
FIG. 1 provides a retinal disease diagnosis process in accordance with an embodiment of the invention.

Turning to the drawings, descriptions of deep learning methods and systems capable of capturing three-dimensional (3D) information from two-dimensional (2D) images, and methods and systems for detecting irregularities in 3D images using such deep learning methods and systems are provided. Examples of 3D images that can be analyzed include (but not limited to): optical coherence tomography, and magnetic resonance imaging. Several embodiments can detect biomarkers within optical coherence tomography (OCT) volumes using deep learning methods and systems. Many embodiments can detect retinal disease related biomarkers from OCT images. Several embodiments provide diagnosis and treatment of retinal diseases including (but not limited to) age-related macular degeneration (AMD), AMD subtypes, AMD progression, and/or AMD deterioration based on the biomarker detection. Examples of AMD subtypes include (but are not limited to) early or intermediate AMD (earlyIntAMD), wet AMD, and geographic atrophy (GA). AMD progression in accordance with an embodiment includes that detection of biomarkers can happen a time period (for example, 3 or 6 months) earlier before the biomarkers become more pronounced. Some embodiments can detect the presence and/or absence of clinically useful biomarkers in OCT images using deep neural networks.

OCT is the primary method for diagnosing retinal diseases including (but not limited to) AMD and determining treatment. OCT scans can produce three-dimensional representations of the retina, which are manually reviewed by a clinician. During a review, clinicians are generally looking for the presence or absence of certain biomarkers that are associated with the disease, which they use to inform clinical decisions. Many embodiments provide methods and systems to identify which of retinal disease related biomarkers are present in OCT scans. Retinal diseases including (but not limited to) AMD-related biomarkers include (but are not limited to): intraretinal hyperreflective feature over drusen, intraretinal hyperreflective feature over non drusen, intraretinal cystoid spaces, drusenoid pigment epithelial detachment (PED), subretinal tissue, subretinal drusenoid deposits, incomplete retinal pigment epithelial and outer retinal atrophy (iRORA), and complete retinal pigment epithelial and outer retinal atrophy (cRORA). Several embodiments are able to reach accurate prediction results using a limited amount of data. A number of embodiments optimize clinical workflow by directly presenting diagnostic results of the biomarkers and obviating manual image review by clinicians. The automated processes in accordance to several embodiments may not be prone to fatigue and/or human biases, thus reduce the risk of mistakes due to human errors. Such embodiments improve diagnostic efficiency in reviewing the images while still leave the clinical decisions to ophthalmologists.

Machine learning applications to 3D biomedical imaging have focused on diagnosis. That is, the algorithm directly attempts to predict (and sometimes localize) the presence or absence of a specific disease, pathology, or lesion. However, the application of these approaches is not clear. While these algorithms may quickly and efficiently locate the diseases for which they are optimized, in practice a physician will still need to review the image to avoid missing incidental findings. In addition, previous algorithms specialized for diagnosis require a large amount of training data for each condition. Lastly, to be successfully deployed in the clinic, algorithms would need to cover an impractically large range of diagnoses. In contrast, recent approaches decompose the diagnosis operation into two steps. These models first identify biomarkers (i.e., biologically relevant features), after which a clinical diagnosis is made. Ideally, when disease classification is made on the basis of these biomarkers, their identification as an explicit step can improve interpretability and be used for report generation. Past studies have identified biomarkers that are generally indicative of AMD as well as other ocular diseases.

Many embodiments incorporate a deep learning neural network to analyze OCT images and detect the presence and/or absence of clinically relevant biomarkers. Several embodiments employ transfer learning to overcome the lack of available training data for canonical deep learning approaches. A number of embodiments employ transfer learning processes in order to apply machine learning in a setting where there is a relatively small amount of sample data. In some embodiments, transfer learning leverages an external dataset including (but not limited to) foveal scans.

Many embodiments incorporate a deep learning architecture that captures 3D information using transfer learning from 2D images to automatically detect these biomarkers within OCT volumes. Certain embodiments represent the 3D OCT volume by "tiling" each slice into a single 2D image, and adding an additional component including (but not limited to) slice integration to encourage the network to consider local spatial structure. A number of embodiments are able to identify the presence or absence of retinal disease related biomarkers including (but not limited to) AMD-related biomarkers on par with clinicians. Beyond identifying biomarkers, additional models could be trained, in accordance to embodiments, to predict the progression of these biomarkers over time.

Many embodiments provide that 2D neural network methods analyzing sliced OCT 2D images to diagnose retinal diseases yield accurate prediction results. Several embodiments show that for AMD biomarker prediction using the available OCT data, the 2D neural network approach outperform 3D neural network methods. Such embodiments implement transfer learning and slice integration, both of which are not limited to biomarker prediction nor OCT classification. Accordingly, several embodiments provide a general framework for applying deep learning to 3D images, wherein a suitable external dataset of 2D images is identified which can supplement the small training set. Such methods and systems transform external data to be compatible and then introduce an operation including (but not limited to) slice integration to counter the loss of information introduced by the data transformation. Embodiments also represent a feasible framework when considering the integration of artificial intelligence into the clinical workflow.

Systems and methods for detecting biomarkers of retinal diseases with OCT scans and image analysis processes that can be utilized in 3D OCT scans in accordance with various embodiments of the invention are discussed further below.

Retinal Disease Diagnosis

Many embodiments utilize accurate and efficient diagnostic processes to predict present of retinal disease biomarkers including (but not limited to) AMD-related biomarkers and provide diagnosis and treatment of retinal diseases based on 3D OCT scan images using deep learning neural network. A method for diagnosing and determining treatment for retinal diseases using a deep learning process in accordance with an embodiment of the invention is illustrated in FIG. 1. The process 100 can begin by obtaining a set of 3D OCT images (101). Some embodiments include input datasets that include OCT scan images. OCT acquires an image of the retina by making a series of 2D image slices. Because of its high axial resolution and near histology level details, OCT provides a method to assess the integrity of the retinal layers in a variety of conditions including (but not limited to) optic nerve disorders, retinal diseases, and systemic conditions which may have ocular manifestations. As can readily be appreciated, any of a variety of input datasets can be utilized as appropriate to the requirements of specific applications in accordance with various embodiments of the invention.

Sets of OCT images in the input datasets can be reshaped into 2D slices (102). In several embodiments, 3D OCT volume in the input datasets can be represented by "tiling" each slice into a single 2D image. In some embodiments, reshaping the 3D OCT scans into 2D slices can be achieved by stacking tiled 2D images on top of one another. In certain embodiments, 2D images can be stacked next to each other based on their order, thus generating a large 2D slice that includes the entire set of 2D images. As can readily be appreciated, any of a variety of reshaping method of 3D OCT images into 2D slices can be utilized as appropriate to the requirements of specific applications.

In certain embodiments, features from 2D slices are extracted by applying a pre-trained feature extractor (103). In a number of embodiments, the feature extractor can be pre-trained based on 2D image processing. In several embodiments, the feature extractor can independently operate on each slice of the OCT volume. Feature extraction including (but not limited to) Resnet 18 operation on 2D slices can be computed in one forward pass.

During a training process (not shown) deep learning diagnostic processes can learn relationships between features in reshaped 2D slices of OCT scans and properties of retinal disease biomarkers using a training dataset. Many embodiments employ transfer learning to alleviate the lack of available large training datasets for canonical deep learning approaches. Several embodiments first train the processes with an existing but similar dataset, and then fine-tune with the OCT scan datasets. Some embodiments use suitable image databases including (but not limited to) the ImageNet database. In several embodiments, the training datasets can be publicly available OCT scan images. OCT scan images in accordance to some embodiments are annotated with one of the retinal conditions: choroidal neovascularization (CNV), diabetic macular edema (DME), and drusen, providing more similarity to the biomarker prediction input datasets. As can readily be appreciated, any of a variety of training datasets can be utilized as appropriate to the requirements of specific applications in accordance with various embodiments of the invention.

The deep learning processes can utilize slice pooling and/or slice integration that samples various values across all spatial dimensions (104). In several embodiments, slice pooling can flatten features that will be collapsed in a final feature vector. Some embodiments implement slice pooling as a flatten layer. Examples of slice pooling include (but are not limited to) maximum (max) pooling, average pooling, geometric mean, average sum of squares, sum of cubes, Lp norm of the image (Lp is equivalent to the sum of $x_i^p$). Some embodiments employ maximum and average pooling across all spatial dimensions. In max pooling, the maximum value across all spatial dimensions can be calculated. In average pooling, the average value across all spatial dimensions can be calculated. The tiling approach described in 102 may remove access to local 3D structure of the OCT data. In order to preserve correspondence among neighboring slices, many embodiments perform slice integration including (but not limited to) maximum and average pooling that can capture the 3D structure of the tiles. Some embodiments may omit slice pooling steps. As can readily be appreciated, any of a variety of slice pooling methods can be utilized as appropriate to the requirements of specific applications in accordance with various embodiments of the invention.

In many embodiments, deep learning neural networks including (but not limited to) convolutional neural networks (CNNs) can be applied across the slices (105). Some embodiments produce a final feature vector containing a number of features. In several embodiments, a 1D CNN can be applied to aggregate slices from slice pooling. As can readily be appreciated, any of a variety of deep learn neural networks can be utilized as appropriate to the requirements of specific applications in accordance with various embodiments of the invention.

The final feature vector can be transformed into predictive biomarkers in a ranking and/or categorization (106) of at least the features in the input dataset. In many embodiments, biomarkers can be predicted in a multi-task approach, in which a single network simultaneously predicts the presence of all targets. Biomarkers present in OCT scans in accordance to many embodiments include (but are not limited to): intraretinal hyperreflective feature over drusen, intraretinal hyperreflective feature over non drusen, intraretinal cystoid spaces, drusenoid pigment epithelial detachment (PED), subretinal tissue, subretinal drusenoid deposits, incomplete retinal pigment epithelial and outer retinal atrophy (iRORA), and complete retinal pigment epithelial and outer retinal atrophy (cRORA). Some embodiments implement feature vector transformation as a decision layer. In certain embodiments, a decision layer receives a feature vector as input and produces an output score in the range of 0 to 1 for classification and/or a real value for regression problems. In many embodiments, a decision layer can be a multilayer perceptron (MLP) that includes multiple fully connected layers with a rectified linear unit (ReLU) between each layer and a rectified linear activation function as output. The fully connected layers which are linear operations combined with the nonlinearity of the ReLU functions may enable the MLP to perform as a universal approximator being able to approximate any function given a sufficient amount of data. As can readily be appreciated, the specific biomarkers used for retinal diseases diagnosis are largely only limited by the requirements of specific applications. The various ways in which deep learning processes can be utilized to predict biomarkers related to retinal diseases in accordance with various embodiments of the invention including specific examples are discussed further below.

In many embodiments, the trained biomarker prediction processes generate output datasets of retinal disease diagnosis and treatment (107). The retinal diseases can include (but are not limited to): age-related macular degeneration, AMD subtypes, AMD progression, and/or AMD deterioration based on the biomarker detection. Examples of AMD subtypes include (but are not limited to) early or intermediate AMD (earlyIntAMD), wet AMD, and geographic atrophy (GA). AMD progression in accordance with an embodiment includes that detection of biomarkers can happen a time period (for example, 3 or 6 months) earlier before the biomarkers become more pronounced. Based on the output datasets, retinal diseases with presence of specific biomarkers can be diagnosed and treatment can be identified.

While various processes for diagnosing retinal diseases using biomarker prediction with OCT scans are described above with reference to FIG. 1, any of a variety of processes that utilize deep learning process to predict the presence of biomarkers in OCT scans can be utilized in the diagnosis of retinal diseases as appropriate to the requirements of specific applications in accordance with various embodiments of the invention. For example, AMD can be diagnosed in a process that utilizes a trained deep learning CNN network featuring slice pooling and transfer learning to predict specific biomarkers from OCT scans using techniques similar to those discussed below.

Biomarker Detection Using OCT Scans

Figure 2:
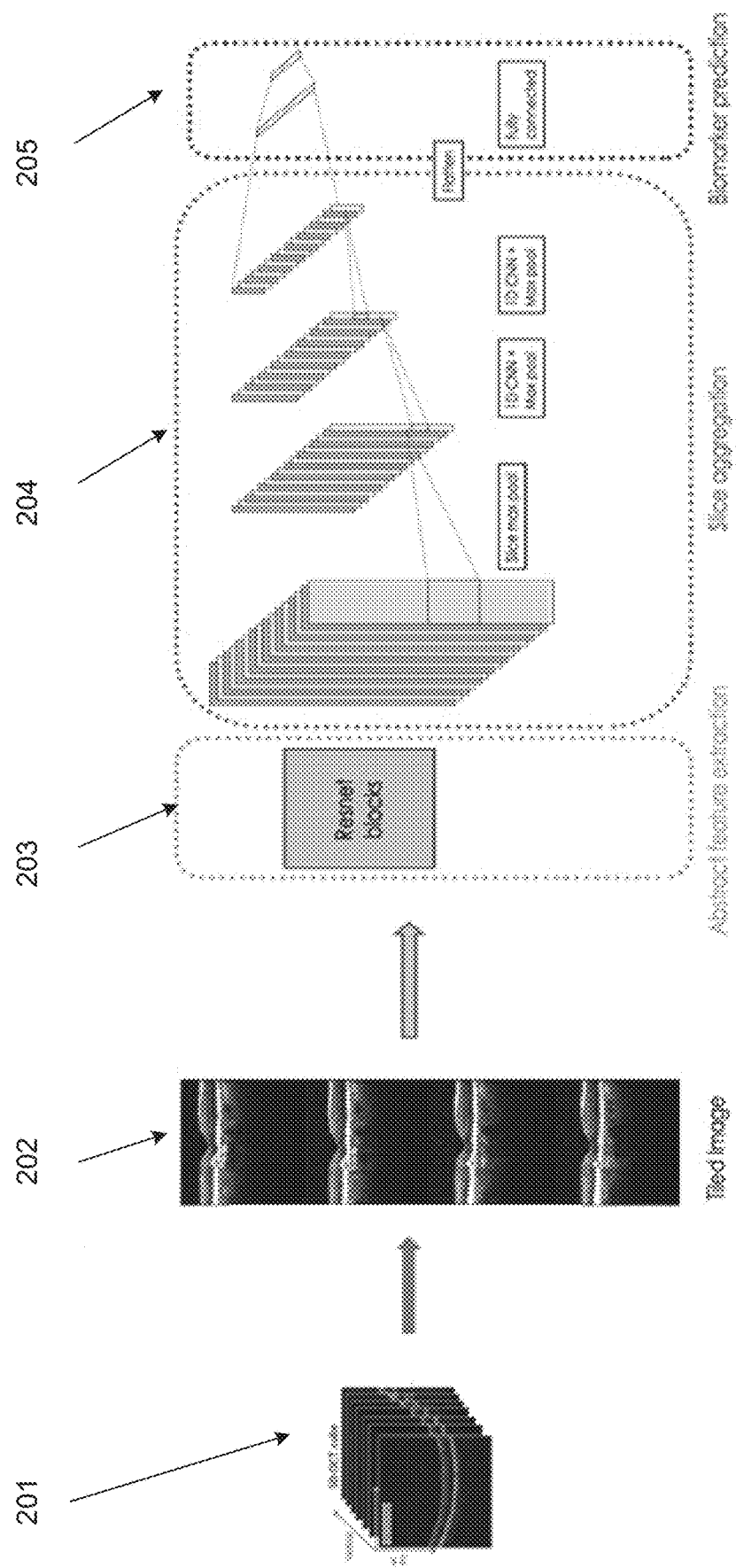
FIG. 2 provides a schematic of the operation of biomarker prediction in accordance with an embodiment of the invention.

Many embodiments use a deep learning architecture that captures 3D information using transfer learning from 2D images to automatically detect these biomarkers within OCT volumes. An AMD-related biomarker prediction process using deep learning neural networks in accordance with an embodiment of the invention is illustrated in FIG. 2. In many embodiments, detection of AMD-related biomarkers starts by obtaining a set of OCT scan images (201). OCT scans produce a 3D representation of retinal structures. Several embodiments reshape the 3D OCT scans into a 2D image by stacking slices on top of one another (202). Some embodiments apply an abstract pre-trained feature extractor based on previous 2D image processing work, which independently operates on each slice of the OCT volume (203). In some embodiments, the abstract feature extractor can be Resnet18. Certain embodiments aggregate each slice using slice integration or slice pooling. In some embodiments, the mean and maximum values from every slice are sampled during slice pooling operation. Lastly, in a number of embodiments, a convolutional neural network (CNN) operates across the slices, which produces the final output of AMD-related biomarkers prediction. Some embodiments use a 1D CNN.

While various processes for predicting AMD-related biomarkers using deep learning processes are described above with reference to FIG. 2, any of a variety of processes that utilize deep learning to analyze OCT images can be utilized in the prediction of biomarkers as appropriate to the requirements of specific applications in accordance with various embodiments of the invention. Processes for performing deep convolution neural networks in accordance with various embodiments of the invention are discussed further below.

Deep Convolutional Neural Networks

Many embodiments implement 3D convolutional neural networks in analyzing OCT scans. Deep convolutional neural networks (CNNs) comprise functions that extract from every image the features that may be the most meaningful for a given task. Each of the functions used in the CNNs can be defined by a vector or a kernel, and a convolution between the image pixels and the kernel. The convolution between an image and a kernel can be similar to correlation in that the image is scanned for patches (for example, 3×3 pixel) that resemble the kernel. The output of a convolution layer can be an image where the value of each pixel is the inner product between the corresponding patch in the input image and the kernel. Consequently, patches that resemble the kernel may produce high values and ones that do not produce values close to zero. In a deep network the output image of each convolutional layer can be the input to the next one where at the end of the deep network the final output may be an abstract representation of the image. The idea behind deep convolutional neural network is to make the network learn the different kernels that will extract meaningful shapes and remove ones that are destructive in order to provide a representation that is optimal for a given task.

Various embodiments use a 2D image CNN architecture including (but not limited to) Resnet18 for image recognition. One of the advantages of Resnet18 may be that it uses residual networks which are easier to optimize (Kaiming He, Xiangyu Zhang, Shaoqing Ren, Jian Sun; The IEEE Conference on Computer Vision and Pattern Recognition (CVPR), 2016, pp. 770-778). Particularly, Resnet18 consists of four residual "blocks", each of which down sample the image by a factor of 2. Thus, after passing through the backbone network, each image of size m×m pixels roughly reduces to m/16×m/16 pixels.

Conventional systems apply a 3D extension to CNNs, namely 3D CNNs. 3D CNNs extend this approach to capture the 3D objects and are commonly applied approach to volume analysis. They have gained popularity in biomedical imaging due to increasingly capable hardware, and are applicable to 3D images such as CT, MRI, and OCT. The input to deep network can be a 3D volume image, such as the one provided by the OCT scans. In the 3D version, the kernels correspond to cube, but the general architecture of Resnet18 can stay the same. While 3D CNNs typically work well if enough data are available, one of the disadvantages of 3D CNNs can be the substantial increase in the number of parameters of the model, since each kernel corresponds to a 3D cube instead of a 2D square.

To account for this, many embodiments instead use 2D CNNs by applying Resnet18 to each of the slices. Specifically, several embodiments stack the 2D images (slices) next to each other based on their order, thus generating a large image that includes the entire set of 2D images. Then, a 2D Resnet18 can be applied to the resulting image. Feature extraction on all 2D slices can be computed in one forward pass. To do this, each of the K slices can be concatenated vertically, forming a tiled image of (K×m) rows and m columns (where each entry corresponds to a pixel). This tiled image can be then passed to the model. The first layer of the model, including the backbone convolutional neural network, can reduce the matrix size to (K×m/16) rows with m/16 columns. This can be performed a specified number of times to allow flexibility to the model. In some embodiments, the operation has been performed 512 times, resulting in a tensor of dimensions (K×m/16)×m/16×512. Then, the final feature map produced by the CNN layers can be collapsed into a feature vector including (but not limited to) 1024 features in the vector using a suitable pooling technique including (but not limited to) max and average pooling in accordance to several embodiments. In some embodiments, max pooling where the maximum value of each of the matrices, each matrix of dimensions (K×m/16)×m/16), can be calculated, resulting in a vector of length 512. Average pooling act similarly, where the average value of each of the matrices can be calculated. Thus, some embodiments may end up with a feature vector of length 1024. In several embodiments, the feature vector can be transformed into predictive biomarkers using multilayer perceptron (MLP). The MLP approach in accordance to many embodiments may consist of multiple fully connected layers with a rectified linear unit (ReLU) between each layer and a rectified linear activation function as output. The rectified linear function corresponds to a piecewise linear function which may be defined as the maximum between zero and the input value, and thus it produces nonnegative values. The fully connected layers which are linear operations combined with the nonlinearity of the ReLU functions enables the MLP to perform as a universal approximator. MLP can approximate any function given a sufficient amount of data, and it can be used in deep neural networks and has shown to provide improved accuracy compared to sigmoid or other activation functions.

The above tiling approach may remove access to local 3D structure of the OCT data. In order to preserve correspondence among neighboring slices, some embodiments may perform the average pooling in a non-standard way that captures the 3D structure of the tiles. In several embodiments, each of the matrices of dimensions (K×m/16)×m/16 corresponds to K 2D images that are adjacent in the OCT data. Certain embodiments may perform the average and maximum pooling on each of the matrices. In some embodiments, each of the matrices can be converted to two vectors of length K (for max-pooling and for average pooling), and overall may have a matrix of specific size (e.g., 1024×K). Many embodiments continue similarly to Resnet18, in a series of layers that include a CNN and then a max-pooling of four consecutive images at a time. The advantage of the approach in accordance to some embodiments can be that images that are adjacent to each other are pooled together. Several embodiments produce a feature vector of specified length including (but not limited to) 1024. Some embodiments transform the feature vectors to the prediction using including (but not limited to) MLP, and linear regression with a rectified linear unit and with L1 or L2 regularization. Although the above description has focused on max and average pooling, it will be understood that other techniques may be used, such as, for example, geometric mean, the average sum of squares, sum of cubes, or more generally the Lp norm of the image (Lp is equivalent to the sum of $x_i^p$).

One limitation of Resnet, and other CNN feature extractors may be that they require a large amount of data to train. Several embodiments alleviate this limitation by incorporating transfer learning. In some embodiments, transfer learning can be applied by first training the network on an existing but similar dataset, and then fine-tuned on the dataset of study. This can be useful since there is an abundance of public datasets that include image data, including MRI and other 3D images such as OCT. In transfer learning, the underlying assumption is that there is an inherent relationship between the different image types, and that most of the network can be learned on one image type, while a small number of parameters including (but not limited to) the parameters in the last layer, can then be modified on the specific image type of interest. As shown in the exemplary embodiments below, non-medical images can provide a substantial boost to the performance. The lack of availability of public OCT images can be overcome using transfer learning in accordance to some embodiments. Several embodiments use any suitable image databases including (but not limited to) the ImageNet database. The ImageNet database includes millions of training images comprised of a thousand non-medical object categories. ImageNet has been used in transfer learning applications for natural images, and models pre-trained on ImageNet perform well on other domains. Several embodiments demonstrate that the vast size of ImageNet can provide substantial information to improve the model's results. Some embodiments provide that some convolutional neural networks can extract general and low-level features. Accordingly, certain embodiments first train a network for the original task of the auxiliary dataset (ImageNet) using a Resnet18 feature extractor. Some embodiments may then discard the decision layer, which is specialized for the auxiliary task. Certain embodiments can then replace the decision layer with a randomly initialized one appropriate for the target task. The new decision layer for OCT purposes can then be trained without changing any of the parameters in the feature extractor. In order to allow flexibility, the whole network can be updated using a reduced learning rate in accordance to some embodiments.

Since ImageNet only includes images, the slice pooling processes in accordance to some embodiments may not be captured in the auxiliary dataset. Several embodiments can adapt the transfer learning approach by re-learning the convolutional networks that are used in the subsequent steps after the first average and max pooling. In many embodiments, these CNNs capture specifically the property that adjacent scans in the CNN representations can also be adjacent physically in the 3D space.

Many embodiments use additional 3D datasets including (but not limited to) OCT datasets that are publicly available. Several embodiments may apply two different approaches. Some embodiments may use these medical 3D images datasets as the auxiliary datasets, and perform the procedures. Several embodiments may use ImageNet to train the model, and then use the 3D image auxiliary datasets to refine the flattening layers of the model. Certain embodiments may use the data generated to train the decision layer.

While various processes for applying deep neural networks are described above, any of a variety of processes that utilize deep learning to analyze OCT images can be utilized as appropriate to the requirements of specific applications in accordance with various embodiments of the invention. Processes for predicting AMD-related biomarkers using deep convolution neural networks in accordance with various embodiments of the invention are discussed further below.

AMD-Related Biomarker Prediction

Figure 3:
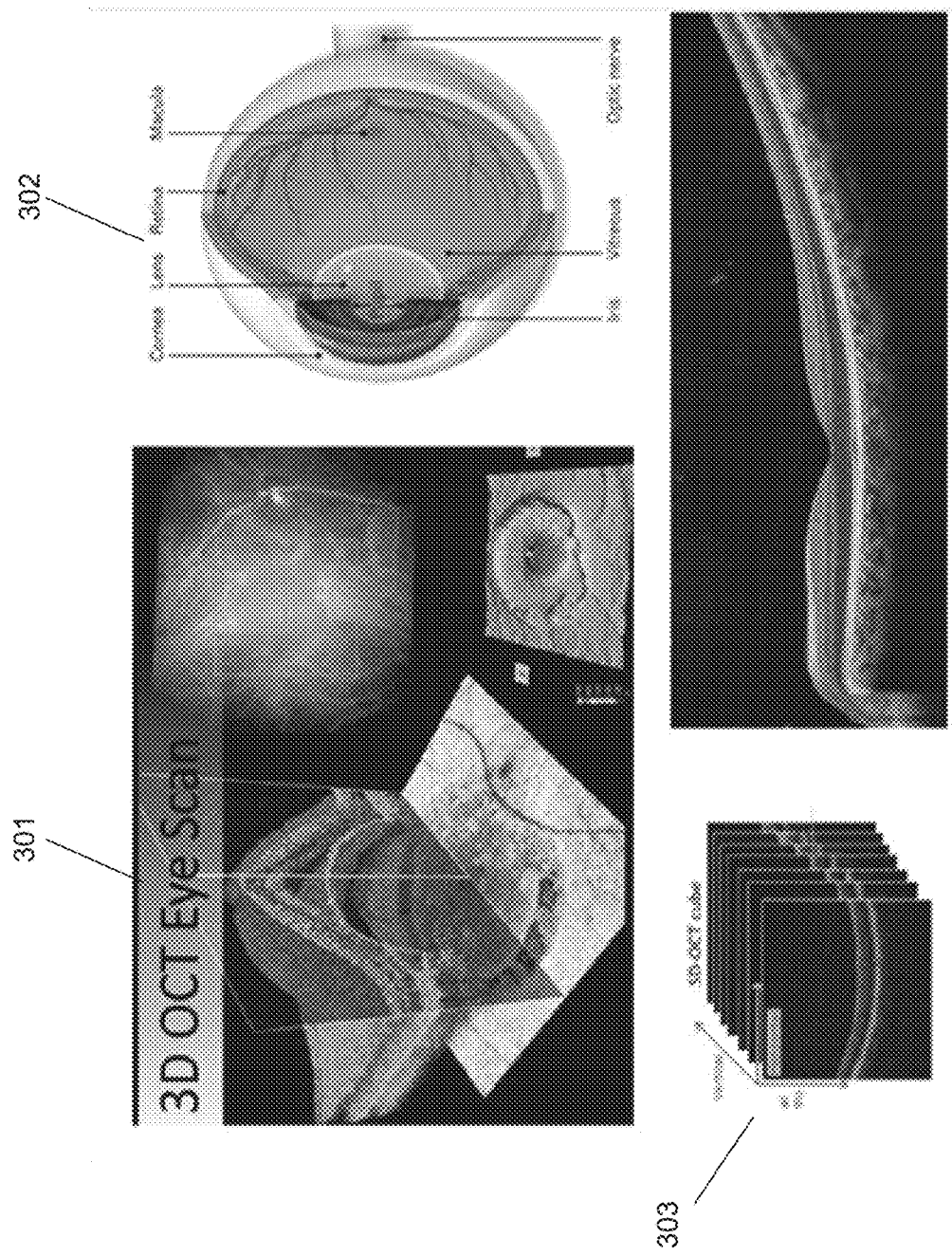
FIG. 3 provides a schematic of the operation of optical coherence topography in accordance with the prior art.

Many embodiments make prediction of AMD-related biomarkers using OCT scan images. A 3D OCT scan of a retinal is illustrated in FIG. 3. A 3D OCT scan image of a retina (301) represents the retinal structure (302). OCT acquires an image of the retina by making a series of 2D image slices (303). Because of its high axial resolution and near histology level detail, OCT provides an excellent method to assess the integrity of the retinal layers in a variety of conditions including optic nerve disorders, retinal diseases, and systemic conditions which may have ocular manifestations. OCT is an integral component of ophthalmic clinical practice, and has been particularly transformative in the management of AMD.

Figure 4:
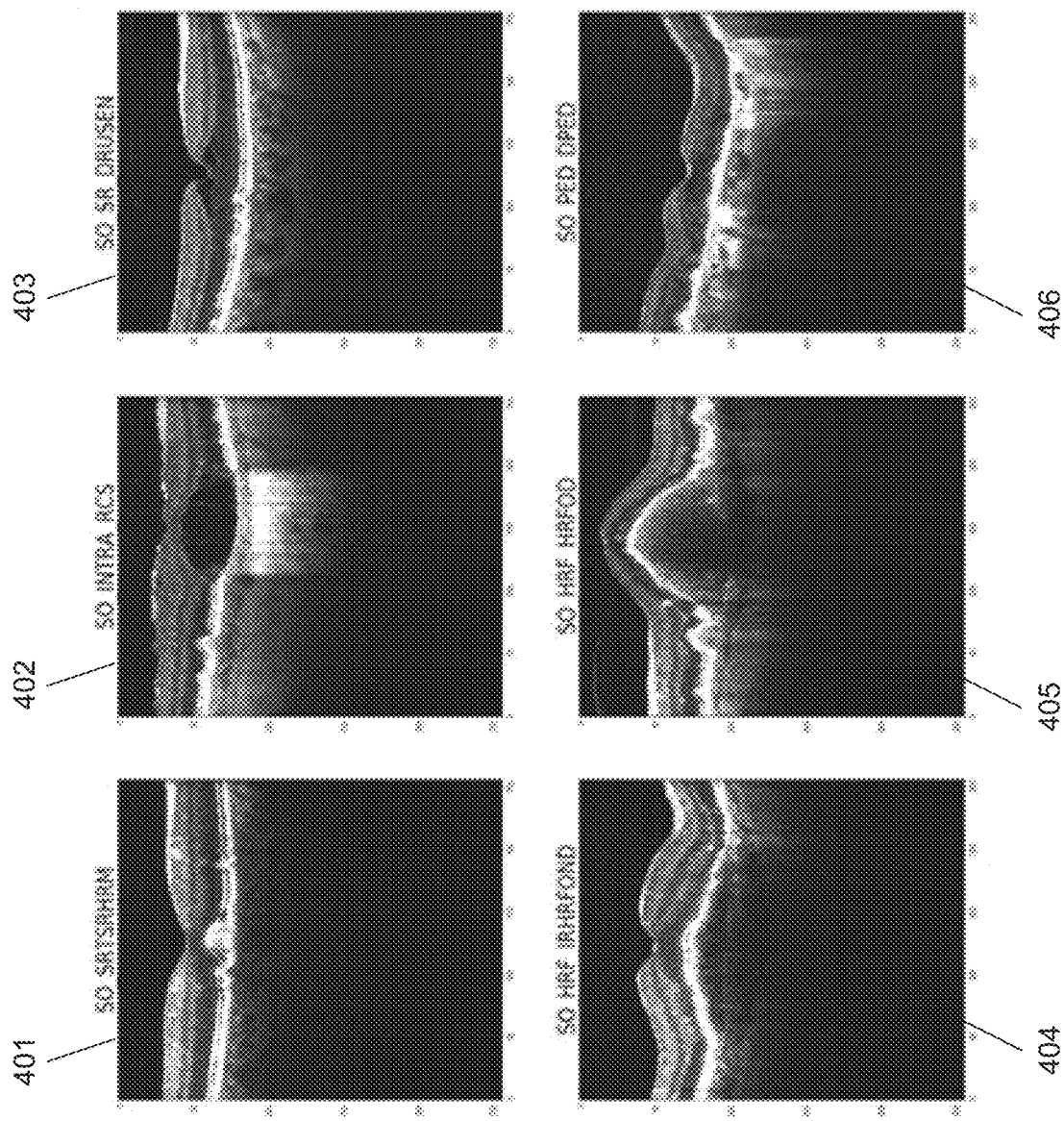
FIG. 4 provides images of foveal scans containing the different biomarkers in accordance with an embodiment of the invention.

Various OCT biomarkers have been associated with AMD risk. Many embodiments identify AMD-related biomarkers including (but not limited to): intraretinal hyperreflective feature over drusen, intraretinal hyperreflective feature over non drusen, intraretinal cystoid spaces, drusenoid pigment epithelial detachment (PED), subretinal tissue, subretinal drusenoid deposits, incomplete retinal pigment epithelial and outer retinal atrophy (iRORA), and complete retinal pigment epithelial and outer retinal atrophy (cRORA). Various AMD-related biomarkers shown in Foveal scans in accordance with an embodiment of the invention are illustrated in FIG. 4. FIG. 4 includes Foveal scans of AMD-related biomarkers: subretinal tissue (401), intraretinal cystoid spaces (402), subretinal drusenoid deposits (403), intraretinal hyperreflective feature over non drusen (404), intraretinal hyperreflective feature over drusen (405), and drusenoid pigment epithelial detachment (406).

Various AMD-related biomarkers and their prevalence of AMD in accordance with an embodiment of the invention are illustrated in FIG. 5. FIG. 5 includes prevalence of AMD-related biomarkers: subretinal tissue about 0.38%, intraretinal cystoid spaces 2.53%, subretinal drusenoid deposits 2.15%, intraretinal hyperreflective feature over non drusen 4.90%, intraretinal hyperreflective feature over drusen 6.28%, and drusenoid pigment epithelial detachment (PED) 13.56%.

The identification of AMD-related biomarkers in OCT scans may require careful manual inspection and quantification of these biomarkers would require manual annotation of the OCT volume, which can be laborious and time consuming. Many embodiments implement automatic tools that can replace the manual annotation. Several embodiments provide a deep learning approach to identify biomarkers associated with AMD risk. Deep learning, however, may use a large amount of training data, while due to the laborious and time-consuming task of manual annotation, it might be infeasible to have a large annotated dataset. Several embodiments incorporate transfer learning to overcome the limitation of annotated OCT scan training dataset. Some embodiments use a publicly available dataset, containing 84,495 2-dimensional OCT images of the fovea scan as training dataset in transfer learning. Many embodiments use a manually annotated dataset for AMD-related biomarkers including OCT volumes from 984 patients within the Amish population that were manually annotated by Nittala et al. (see Exemplary Embodiments, below) as training dataset.

Many embodiments implement a slice integration of volumetric features extracted by pre-trained residual neural networks (SLIVER-net) in AMD-related biomarker prediction. SLIVER-net in accordance to some embodiments differ from standard algorithms. In some embodiments, SLIVER-net re-frames the 3D OCT volume as a 2D "tiling" (e.g. mosaic) of slices, allowing for the use of transfer learning with available datasets. Several embodiments introduce a slice integration module, which allows SLIVER-net to preserve spatial structure.

Many embodiments compare SLIVER-net to a 3D CNN in predicting AMD-related biomarkers from OCT scans. 3D CNNs are commonly used for MRI and CT analysis and represent the current state of the art in volumetric image analysis. (See, e.g., Jin, H., et al., Med. Phys. 45, 2097-2107 (2018); Huang, X., et al., IEEE 14th International Symposium on Biomedical Imaging (ISBI 2017) 379-383 (2017); and Milletari, F., et al., 2016 Fourth International Conference on 3D Vision (3DV) 565-571 (2016), the disclosures of which are incorporated herein by reference.) 3D CNNs are able to consider 3D structure in a volume instead of operating slice by slice but require a very large amounts of training data due to the large number of model parameters. Specifically, 3D CNNs have a larger number of parameters compared to standard 2D CNNs. Several embodiments are trained by a 3D CNN deep learning model to predict biomarkers associated with AMD on the train set (see Exemplary Embodiments, below).

Figure 6A:
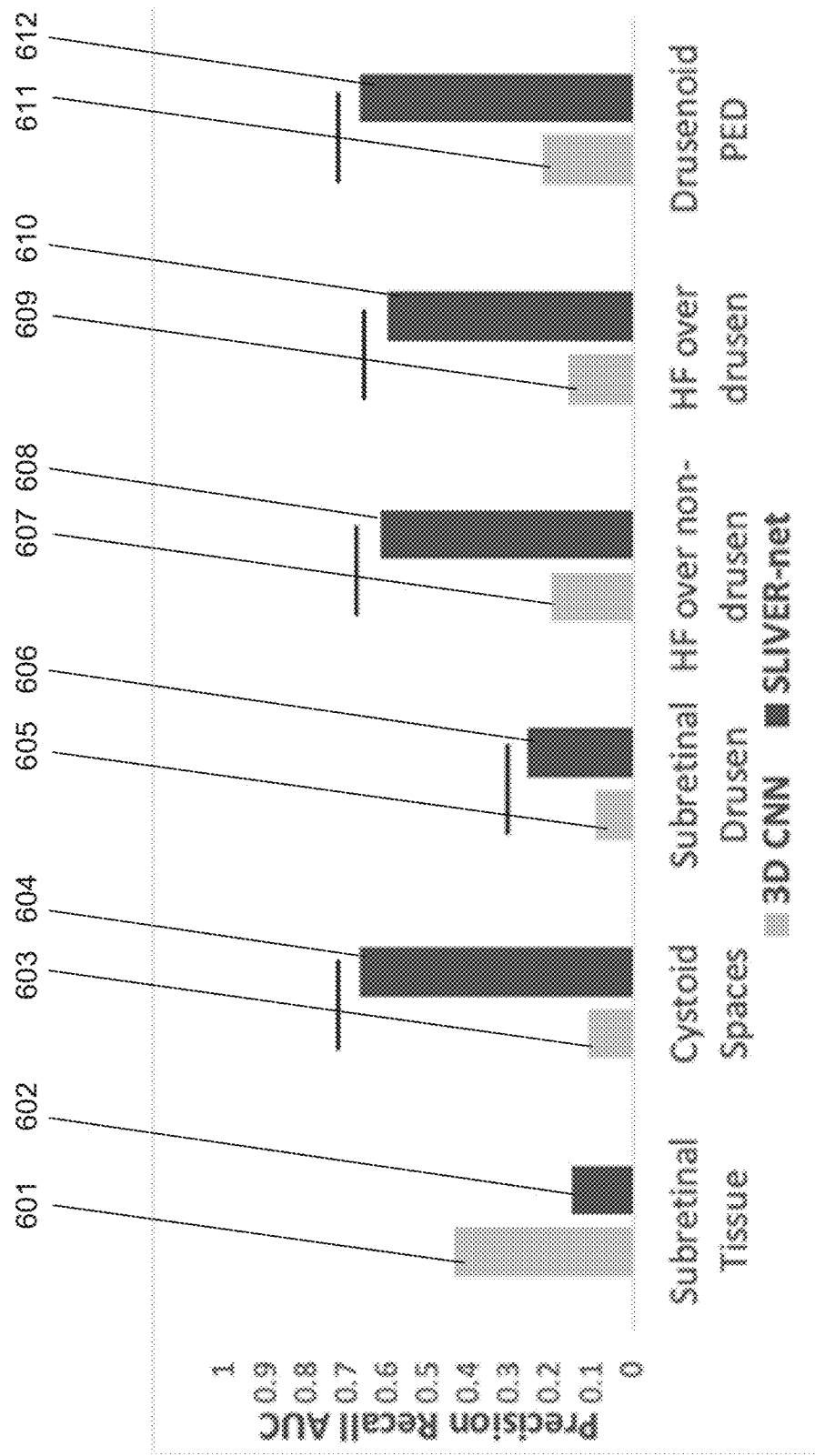
FIGS. 6A and 6B provide the performance of the 3D CNN backbone approach compared with SLIVER-net in precision-recall AUC and ROC AUC for each biomarker in accordance with an embodiment of the invention.

The precision-recall area under curve (AUC) for six AMD-related biomarkers comparison between the 3D CNN backbone approach and SLIVER-net in accordance with an embodiment of the invention are illustrated in FIG. 6A. In FIG. 6A, 601 shows 3D CNN analysis of subretinal tissue biomarker; 602 shows SLIVER-net analysis of subretinal tissue biomarker; 603 shows 3D CNN analysis of cystoid spaces biomarker; 604 shows SLIVER-net analysis of cystoid spaces biomarker; 605 shows 3D CNN analysis of subretinal drusenoid deposits biomarker; 606 shows SLIVER-net analysis of subretinal drusenoid deposits biomarker; 607 shows 3D CNN analysis of intraretinal hyperreflective feature over non-drusen biomarker; 608 shows SLIVER-net analysis of intraretinal hyperreflective feature over non-drusen biomarker; 609 shows 3D CNN analysis of intraretinal hyperreflective feature over drusen biomarker; 610 shows SLIVER-net analysis of intraretinal hyperreflective feature over drusen biomarker; 611 shows 3D CNN analysis of drusenoid PED biomarker; 612 shows SLIVER-net analysis of drusenoid PED biomarker. On the test set (818 volumes), the 3D CNN predicted all biomarkers with a median precision recall AUC of about 0.18, while SLIVER-net performed with a median precision recall AUC of about 0.61. SLIVER-net shows overall significant improvement over current approach by about 52% in terms of precision-recall AUC (p-value <0.001).

Figure 6B:
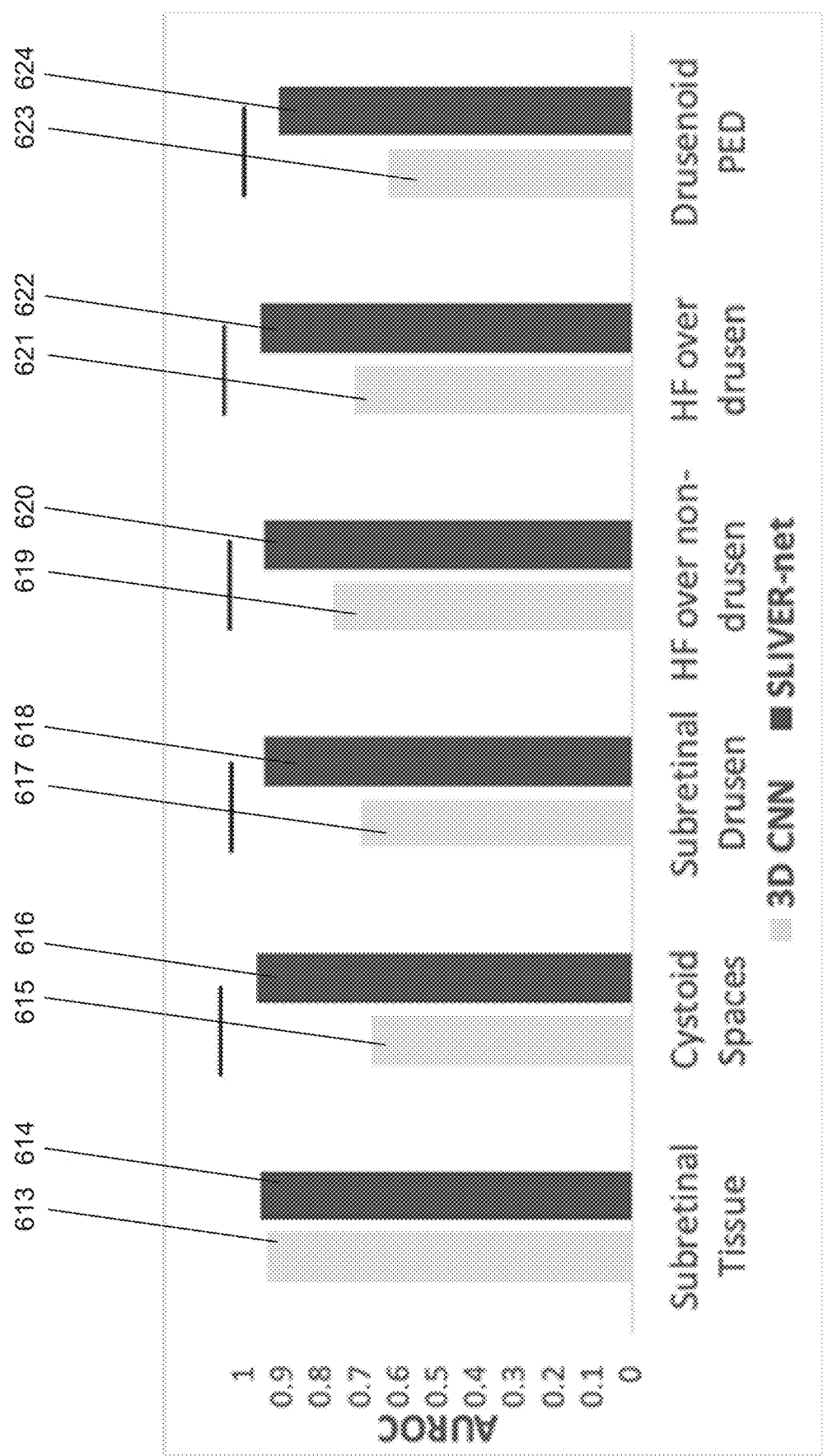

The median receiver operating characteristic (ROC) under the AUC for six AMD-related biomarkers comparison between the 3D CNN backbone approach and SLIVER-net in accordance with an embodiment of the invention are illustrated in FIG. 6B. In FIG. 6B, 613 shows 3D CNN analysis of subretinal tissue biomarker; 614 shows SLIVER-net analysis of subretinal tissue biomarker; 615 shows 3D CNN analysis of cystoid spaces biomarker; 616 shows SLIVER-net analysis of cystoid spaces biomarker; 617 shows 3D CNN analysis of subretinal drusenoid deposits biomarker; 618 shows SLIVER-net analysis of subretinal drusenoid deposits biomarker; 619 shows 3D CNN analysis of intraretinal hyperreflective feature over non-drusen biomarker; 620 shows SLIVER-net analysis of intraretinal hyperreflective feature over non-drusen biomarker; 621 shows 3D CNN analysis of intraretinal hyperreflective feature over drusen biomarker; 622 shows SLIVER-net analysis of intraretinal hyperreflective feature over drusen biomarker; 623 shows 3D CNN analysis of drusenoid PED biomarker; 624 shows SLIVER-net analysis of drusenoid PED biomarker. On the test set (818 volumes), the 3D CNN predicted all biomarkers with a median receiver operating characteristic (ROC) area under the curve (AUC) of 0.71, while SLIVER-net performed with a median ROC AUC of 0.96. SLIVER-net shows overall significant improvement over current approach by 33% in terms of ROC AUC (p-value <0.001).

Figure 7:
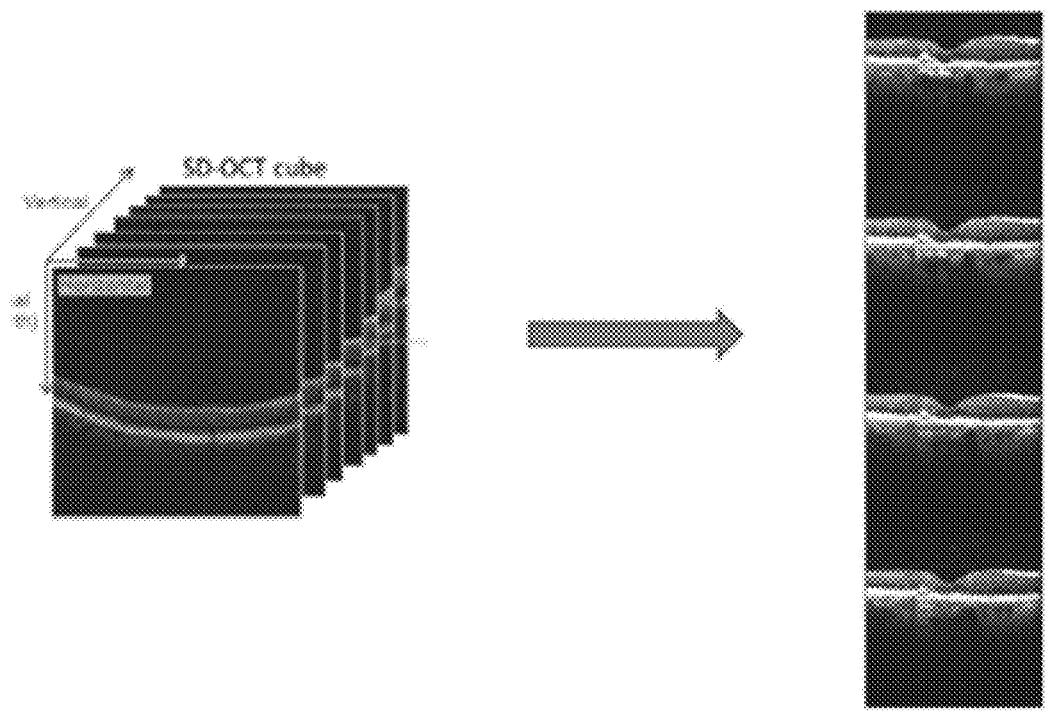
FIG. 7 provides a schematic of methods and systems for 3D to 2D domain adaptation in accordance with an embodiment of the invention.

To enable transfer learning, several embodiments represent OCT volumes as two dimensional tiled by stacking images on top of another. 3D OCT scans reshaping into 2D tiled images in accordance with an embodiment of the invention are illustrated in FIG. 7. 3D OCT volume can be reshaped to 2D slices and the 2D slices can be stacking on top of another to reconstruct a 2D OCT slice.

To preserve 3D structure in OCT volume, many embodiments employ slice integration. Some embodiments apply a CNN including (but not limited to) Resnet18, which is termed Tile-RESNET. However, in converting the 3D representation to 2D, a CNN (a RESNET18, for example) may lose the ability to capture three-dimensional patterns. Several embodiments extend Tile-RESNET by adding a slice integration module, consisting of a 1D CNN that encourage the model to respect local spatial structure and utilize the original volumetric shape of the generated 2D tile. SLIVER-net is the combination of Tile-RESNET with slice integration.

Figure 8A:
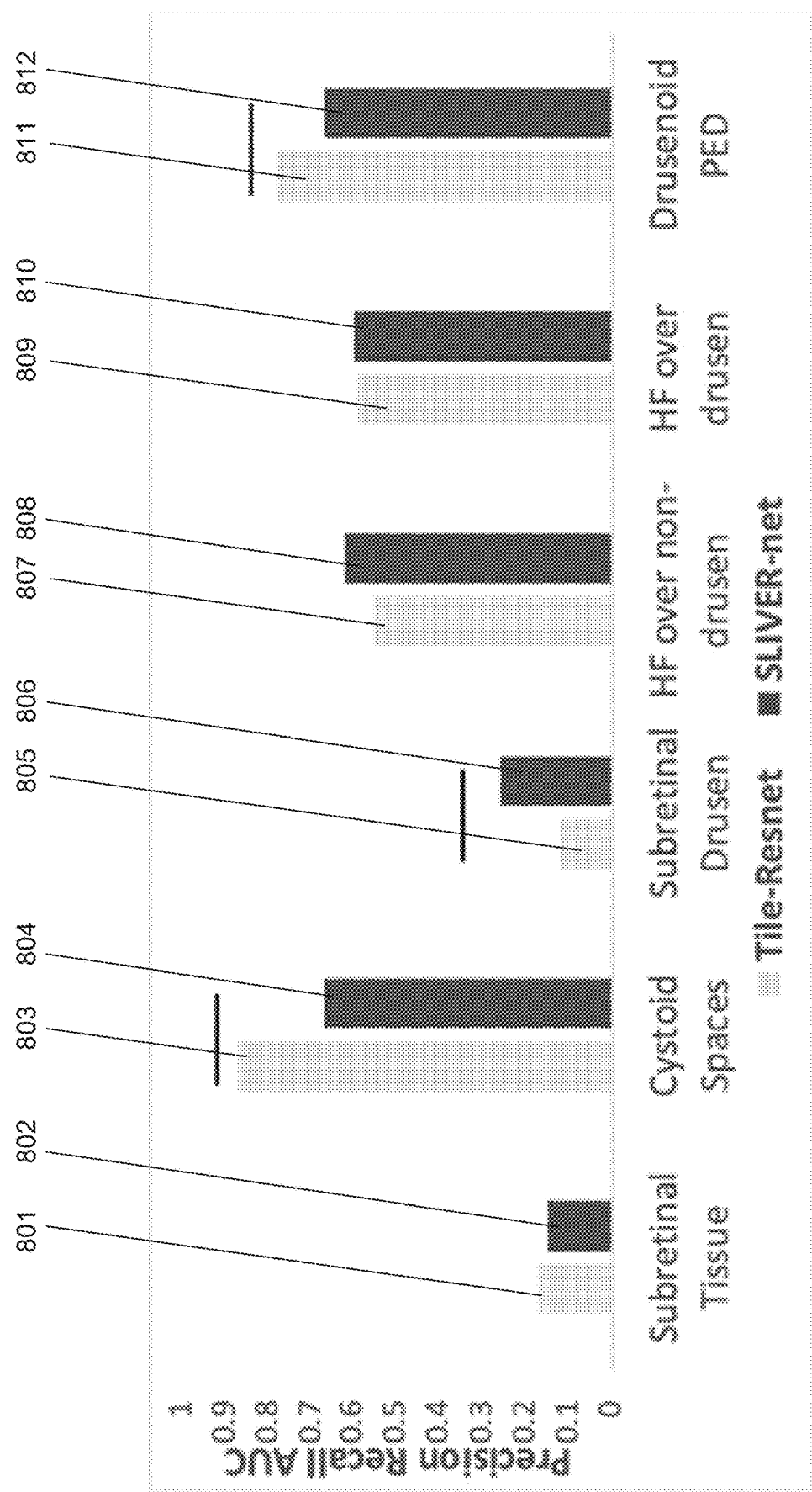
FIGS. 8A and 8B provide the biomarker prediction performance without and with the slice-integration operation in precision-recall AUC and ROC AUC for each biomarker in accordance with an embodiment of the invention.

Several embodiments provide that adding slice integration can improve the biomarker prediction performance due to SLIVER-net's ability to identify 3-dimensional patterns. A number of embodiments evaluate slice integration by comparing SLIVER-net with Tile-RESNET, where both models are pre-trained using transfer learning. The precision-recall area under curve (AUC) for six AMD-related biomarkers comparison between the Tile-RESNET and SLIVER-net in accordance with an embodiment of the invention are illustrated in FIG. 8A. In FIG. 8A, 801 shows Tile-RESNET analysis of subretinal tissue biomarker; 802 shows SLIVER-net analysis of subretinal tissue biomarker; 803 shows Tile-RESNET of cystoid spaces biomarker; 804 shows SLIVER-net analysis of cystoid spaces biomarker; 805 shows Tile-RESNET analysis of subretinal drusenoid deposits biomarker; 806 shows SLIVER-net analysis of subretinal drusenoid deposits biomarker; 807 shows Tile-RESNET analysis of intraretinal hyperreflective feature over non-drusen biomarker; 808 shows SLIVER-net analysis of intraretinal hyperreflective feature over non-drusen biomarker; 809 shows Tile-RESNET analysis of intraretinal hyperreflective feature over drusen biomarker; 810 shows SLIVER-net analysis of intraretinal hyperreflective feature over drusen biomarker; 811 shows Tile-RESNET analysis of drusenoid PED biomarker; 812 shows SLIVER-net analysis of drusenoid PED biomarker. Tile-RESNET predicts AMD-related biomarkers with a median precision-recall AUC of 0.57[CI: 0.46,0.70]. SLIVER-net predicts AMD-related biomarkers with a precision-recall AUC of 0.61[CI: 0.49,0.68], outperforming Tile-RESNET. The addition of slice integration can improve the overall performance due to SLIVER-net's ability to identify 3-dimensional patterns.

Figure 8B:
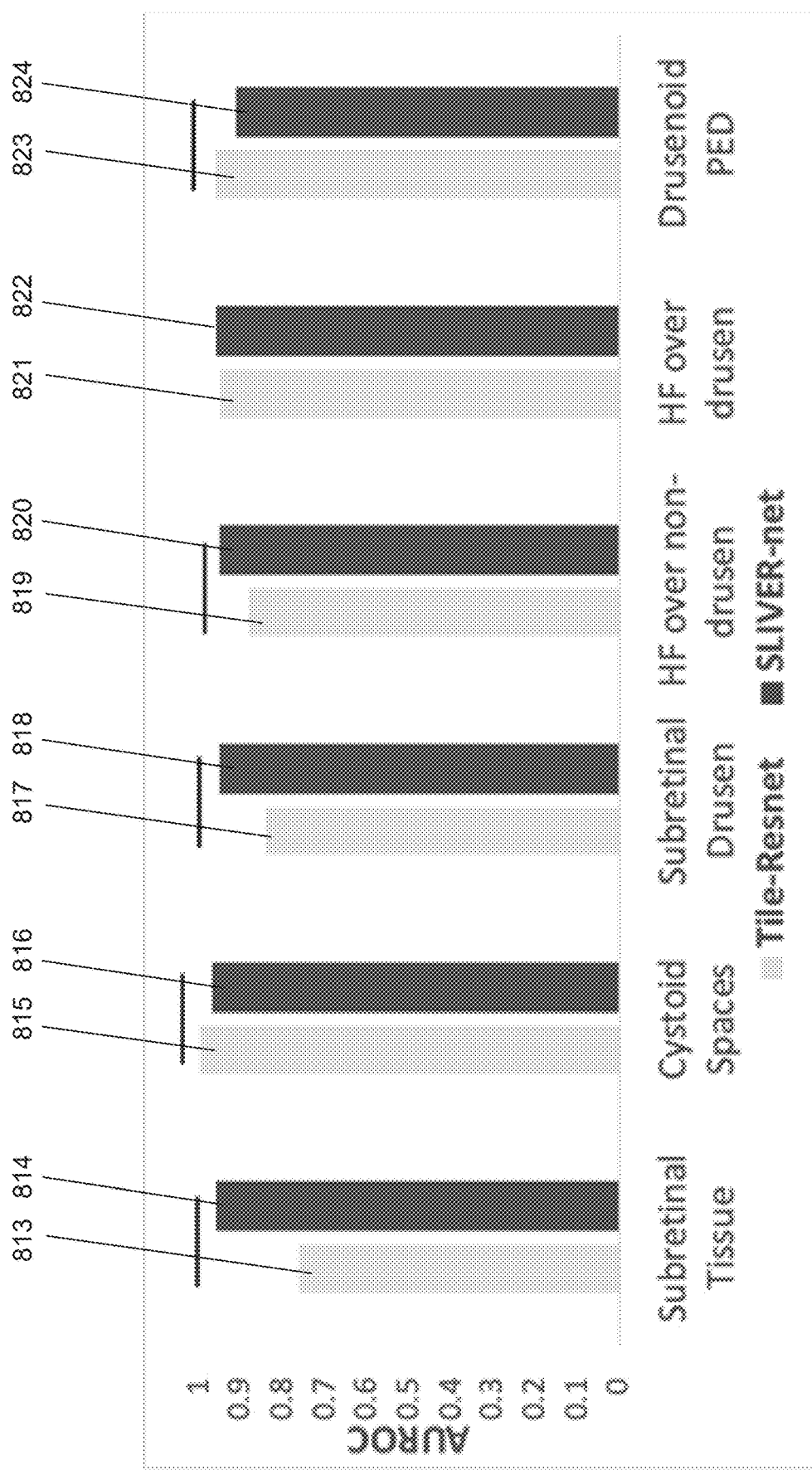

The median receiver operating characteristic (ROC) under the AUC for six AMD-related biomarkers comparison between the Tile-RESNET backbone approach and SLIVER-net in accordance with an embodiment of the invention are illustrated in FIG. 8B. In FIG. 8B, 813 shows Tile-RESNET analysis of subretinal tissue biomarker; 814 shows SLIVER-net analysis of subretinal tissue biomarker; 815 shows Tile-RESNET analysis of cystoid spaces biomarker; 816 shows SLIVER-net analysis of cystoid spaces biomarker; 817 shows Tile-RESNET analysis of subretinal drusenoid deposits biomarker; 818 shows SLIVER-net analysis of subretinal drusenoid deposits biomarker; 819 shows Tile-RESNET analysis of intraretinal hyperreflective feature over non-drusen biomarker; 820 shows SLIVER-net analysis of intraretinal hyperreflective feature over non-drusen biomarker; 821 shows Tile-RESNET analysis of intraretinal hyperreflective feature over drusen biomarker; 822 shows SLIVER-net analysis of intraretinal hyperreflective feature over drusen biomarker; 823 shows Tile-RESNET analysis of drusenoid PED biomarker; 824 shows SLIVER-net analysis of drusenoid PED biomarker. Tile-RESNET predicts AMD-related biomarkers with a median ROC AUC of 0.91[CI: 0.88,0.95]. SLIVER-net predicts AMD-related biomarkers with a median ROC AUC of 0.96[CI: 0.94,0.97], outperforming Tile-RESNET. The addition of slice integration can improve the overall performance due to SLIVER-net's ability to identify 3-dimensional patterns.

Many embodiments provide that transfer learning can improve biomarker prediction performance. In several embodiments, training data consists of 1325 volumes annotated for biomarker prediction while deep learning models generally require more. After posing the volume prediction problem in 2D, some embodiments are able to incorporate a large publicly available dataset using transfer learning. Transfer learning has been used to address prediction problems when the amount of training data is small. In several embodiments, the model is "pre-trained" on a similar task, usually with a larger dataset. The model is then fine-tuned for the task at hand (see Exemplary Embodiments for details). In some embodiments, SLIVER-net is pretrained on the OCT dataset collected by Kermany et al., 2018. This set consists of 84,495 2D OCT images (e.g., slices) of the fovea but are labeled with ocular diseases including choroidal neovascularization (CNV), diabetic macular edema (DME) and drusens. The pretrained network is then fine-tuned for the biomarker prediction task.

Some embodiments evaluate SLIVER-net with and without pre-training. Pre-training the model with the Kermany data can result in better performance (p<0.001) when compared with training the model from scratch. The effectiveness of the transfer learning procedure may depend on the size of the external data, as well as its similarity to the target task. While the Kermany data contains nearly 85,000 OCT scans, there are even larger but less related datasets. Natural images from the ImageNet dataset (1 million samples with 1000 classes) may provide a good foundation for the transfer learning approach based on the sheer volume of training data. Many embodiments compare the performance of SLIVER-net pretrained with data from Kermany et al. 2018 (SLIVER-net) against the same model pretrained with data from ImageNet (ImageNet-SLIVER).

Figure 9A:
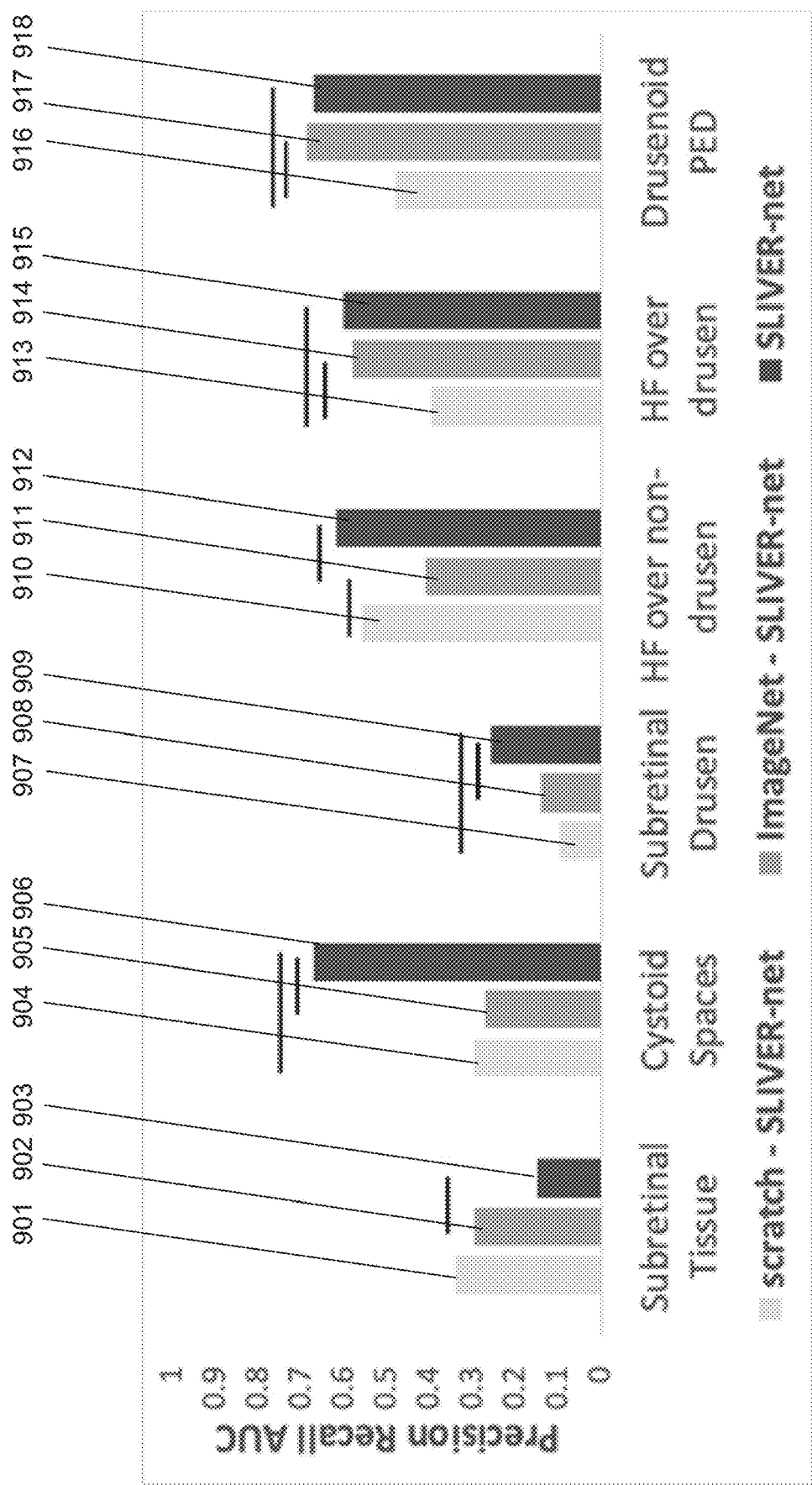
FIGS. 9A and 9B provide the transfer learning evaluation of SLIVER-net trained from scratch, SLIVER-net pre-trained using ImageNet, and SLIVER-net pre-trained using Kermany in precision-recall AUC and ROC AUC for each biomarker in accordance with an embodiment of the invention.

The precision-recall area under curve (AUC) for six AMD-related biomarkers comparison from the scratch SLIVER-net, ImageNet-SILVER-net, and SLIVER-net in accordance with an embodiment of the invention are illustrated in FIG. 9A. In FIG. 9A, 901 shows scratch-SILVER-net analysis of subretinal tissue biomarker; 902 shows ImageNet-SILVER-net analysis of subretinal tissue biomarker; 903 shows SLIVER-net analysis of subretinal tissue biomarker; 904 shows scratch-SILVER-net analysis of cystoid spaces biomarker; 905 shows ImageNet-SILVER-net analysis of cystoid spaces biomarker; 906 shows SLIVER-net analysis of cystoid spaces biomarker; 907 shows scratch-SILVER-net analysis of subretinal drusenoid deposits biomarker; 908 shows ImageNet-SILVER-net analysis of subretinal drusenoid deposits biomarker; 909 shows SLIVER-net analysis of subretinal drusenoid deposits biomarker; 910 shows scratch-SILVER-net analysis of intraretinal hyperreflective feature over non-drusen biomarker; 911 shows ImageNet-SILVER-net analysis of intraretinal hyperreflective feature over non-drusen biomarker; 912 shows SLIVER-net analysis of intraretinal hyperreflective feature over drusen biomarker; 913 shows scratch-SILVER-net analysis of intraretinal hyperreflective feature over drusen biomarker; 914 shows ImageNet-SILVER-net analysis of intraretinal hyperreflective feature over drusen biomarker; 915 shows SLIVER-net analysis of intraretinal hyperreflective feature over drusen biomarker; 916 shows scratch-SILVER-net analysis of drusenoid PED biomarker; 917 shows ImageNet-SILVER-net analysis of drusenoid PED biomarker; 918 shows SLIVER-net analysis of drusenoid PED biomarker. SLIVER-net is pre-trained with the Kermany data. ImageNet-SLIVER-net is pre-trained with the ImageNet dataset. Scratch-SLIVER-net trains the model from scratch and has a median precision-recall AUC of about 0.37[0.29,0.50]. SLIVER-net has better performance (p<0.001) when compared with scratch-SLIVER-net. SLIVER-net with a median precision-recall AUC of 0.61 [CI: 0.49,0.68] outperforms ImageNet-SLIVER with a median precision-recall AUC of 0.37[CI: 0.30,0.51].

Figure 9B:
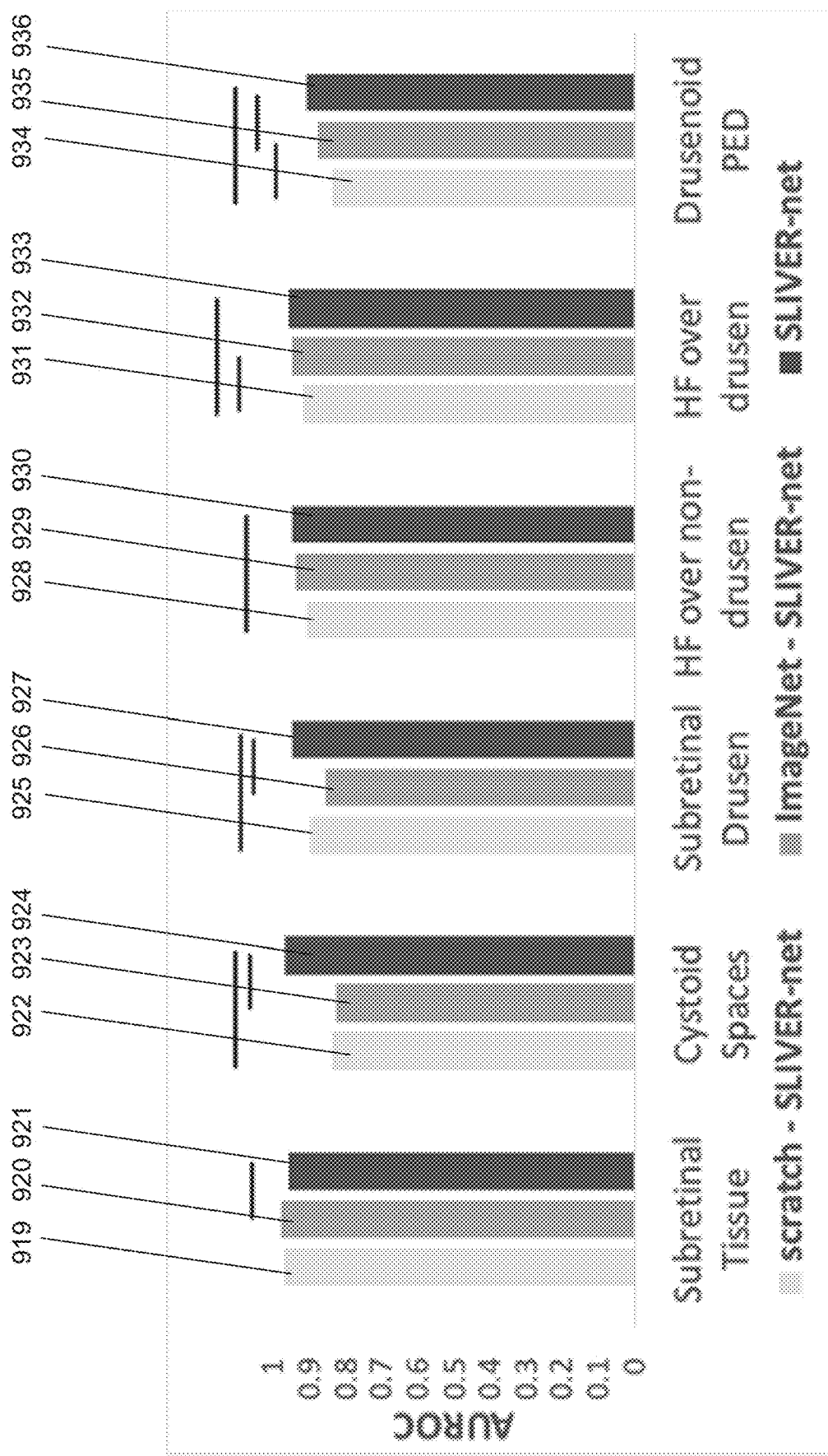

The median receiver operating characteristic (ROC) under the AUC for six AMD-related biomarkers comparison from the scratch SLIVER-net, ImageNet-SILVER-net, and SLIVER-net in accordance with an embodiment of the invention are illustrated in FIG. 9B. In FIG. 9B, 919 shows scratch-SILVER-net analysis of subretinal tissue biomarker;

920 shows ImageNet-SILVER-net analysis of subretinal tissue biomarker; 921 shows SLIVER-net analysis of subretinal tissue biomarker; 922 shows scratch-SILVER-net analysis of cystoid spaces biomarker; 923 shows ImageNet-SILVER-net analysis of cystoid spaces biomarker; 924 shows SLIVER-net analysis of cystoid spaces biomarker; 925 shows scratch-SILVER-net analysis of subretinal drusenoid deposits biomarker; 926 shows ImageNet-SILVER-net analysis of subretinal drusenoid deposits biomarker; 927 shows SLIVER-net analysis of subretinal drusenoid deposits biomarker; 928 shows scratch-SILVER-net analysis of intraretinal hyperreflective feature over non-drusen biomarker; 929 shows ImageNet-SILVER-net analysis of intraretinal hyperreflective feature over non-drusen biomarker; 930 shows SLIVER-net analysis of intraretinal hyperreflective feature over non-drusen biomarker; 931 shows scratch-SILVER-net analysis of intraretinal hyperreflective feature over drusen biomarker; 932 shows ImageNet-SILVER-net analysis of intraretinal hyperreflective feature over drusen biomarker; 933 shows SLIVER-net analysis of intraretinal hyperreflective feature over drusen biomarker; 934 shows scratch-SILVER-net analysis of drusenoid PED biomarker; 935 shows ImageNet-SILVER-net analysis of drusenoid PED biomarker; 936 shows SLIVER-net analysis of drusenoid PED biomarker. SLIVER-net is pre-trained with the Kermany data. ImageNet-SLIVER-net is pre-trained with the ImageNet dataset. Scratch-SLIVER-net trains the model from scratch and has a median ROC AUC 0.91[CI: 0.87,0.93]. SLIVER-net has better performance (p<0.001) when compared with scratch-SLIVER-net. SLIVER-net with a median ROC AUC of 0.96[CI: 0.94,0.97] outperforms ImageNet-SLIVER with a median ROC AUC of 0.91[CI: 0.87,0.93]. However, for identifying subretinal tissues, training the model from scratch results in better performance. This might indicate that subretinal tissues may be different than the objects annotated in the dataset, as it has been shown that transfer learning works better for similar tasks.

The precision-recall area under curve and median ROC under the AUC for six AMD-related biomarkers comparison from the pre-trained Tile model, Tile model from scratch, slice pooling model, slice pooling model from scratch, and 3D CNN in accordance with an embodiment of the invention are illustrated in FIG. 10.

Figure 11:
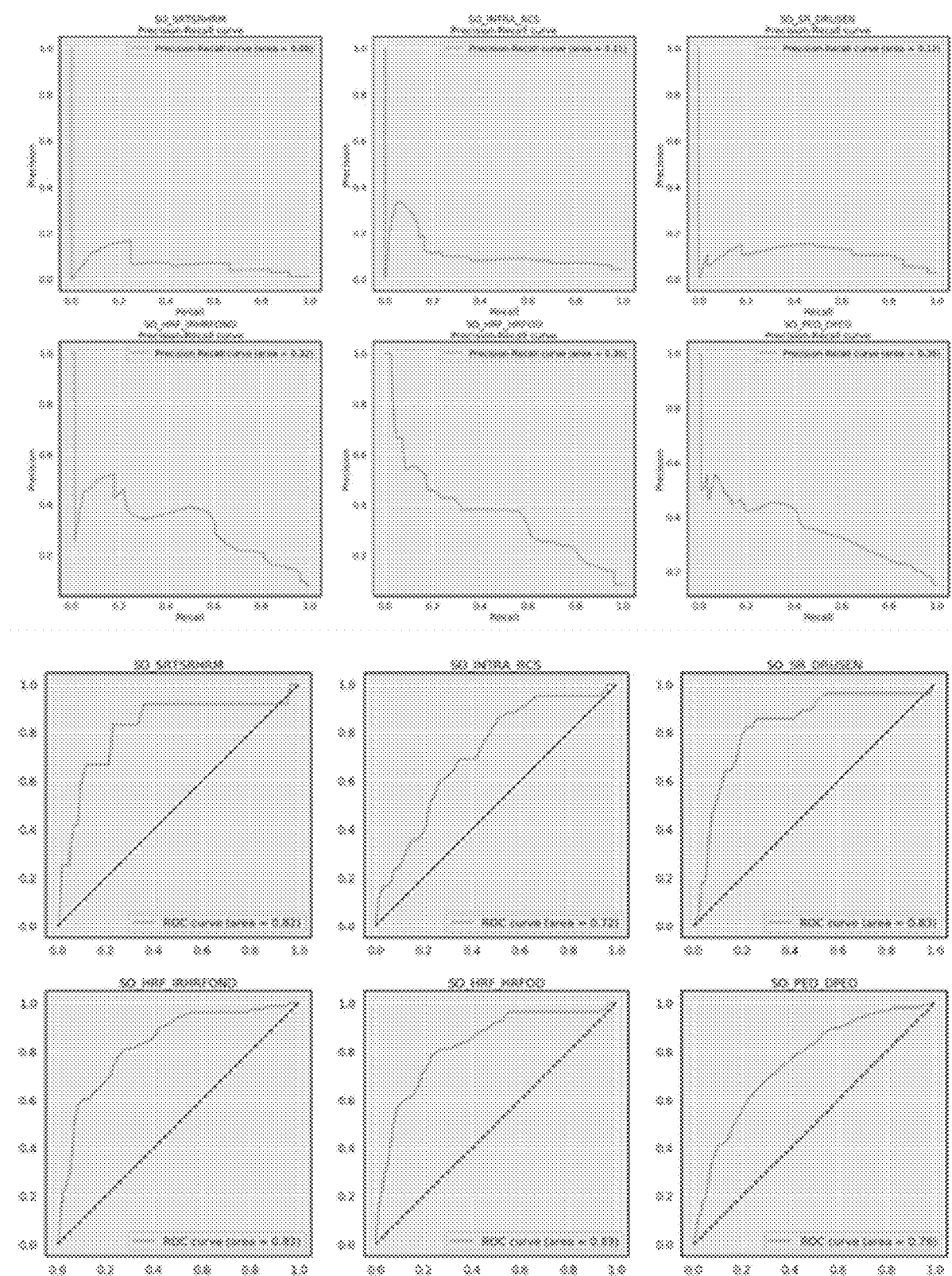
FIG. 11 provides data on the performance using demographic features in accordance with an embodiment of the invention.

Many embodiments provide that SLIVER-net is an image-based model, and does not consider other factors such as sex and age. In several embodiments, adding sex and age information to the model does not significantly improve performance. Some embodiments show that age factor appears to be predictive of some biomarkers. SLIVER-net captures age information to some degree in accordance to several embodiments. The precision-recall area under curve and median ROC under the AUC for six AMD-related biomarkers using demographic features in accordance with an embodiment of the invention are illustrated in FIG. 11.

Figure 13A:
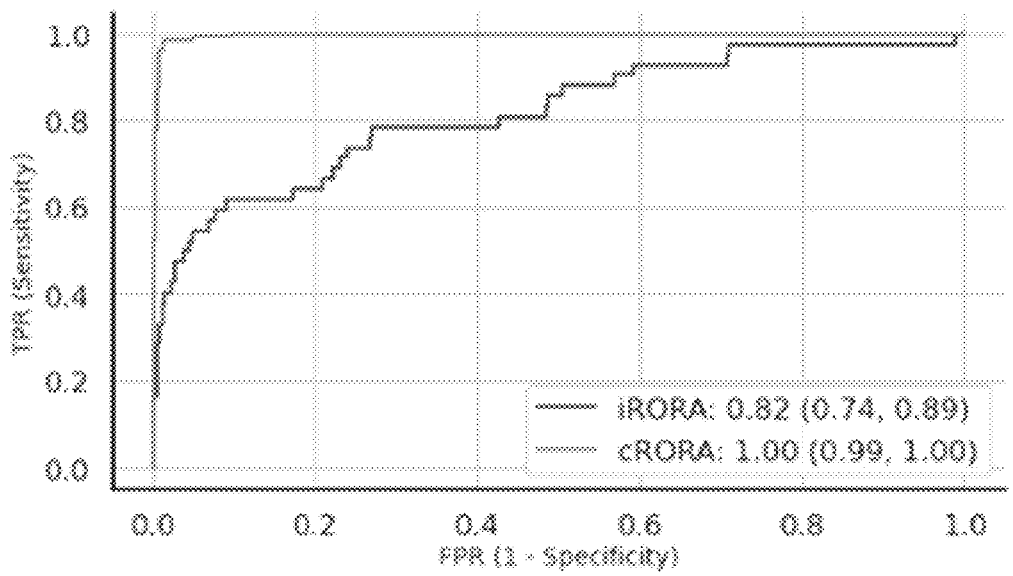
FIGS. 13A and 13B provide the performance of SLIVER-net in terms of Receiver Operating Characteristic (ROC) and Precision-Recall for identifying incomplete or complete retinal pigment epithelial and outer retinal atrophy (iRORA or cRORA).
Figure 13B:
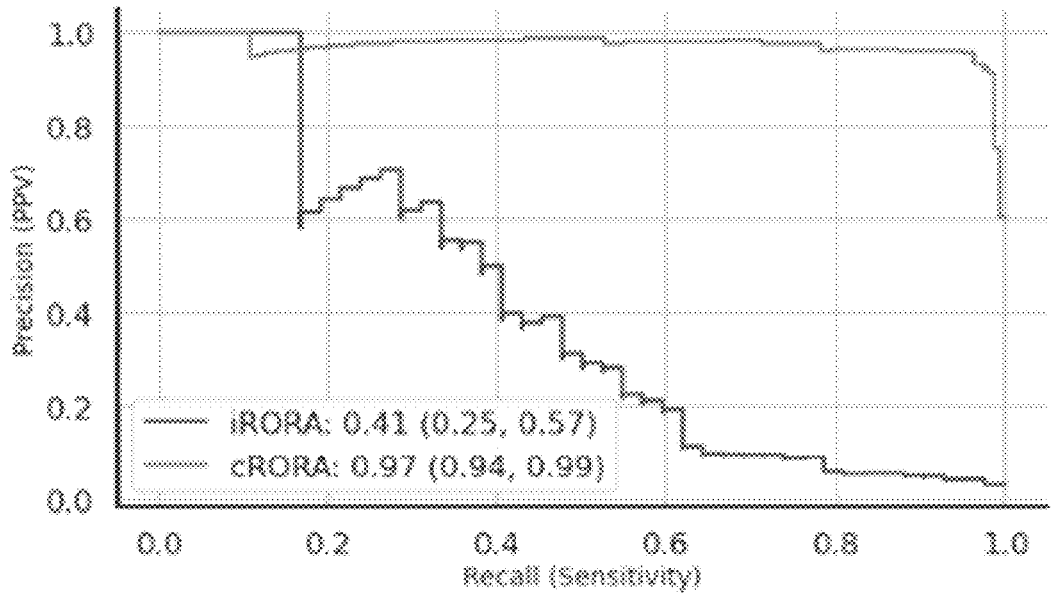

In several embodiments, biomarkers including (but not limited to) iRORA and cRORA can be detected with the deep learning methods. The performance of the deep learning model predicting iRORA and cRORA biomarkers in accordance with an embodiment of the invention are illustrated in FIGS. 13A and 13B.

Figure 14A:
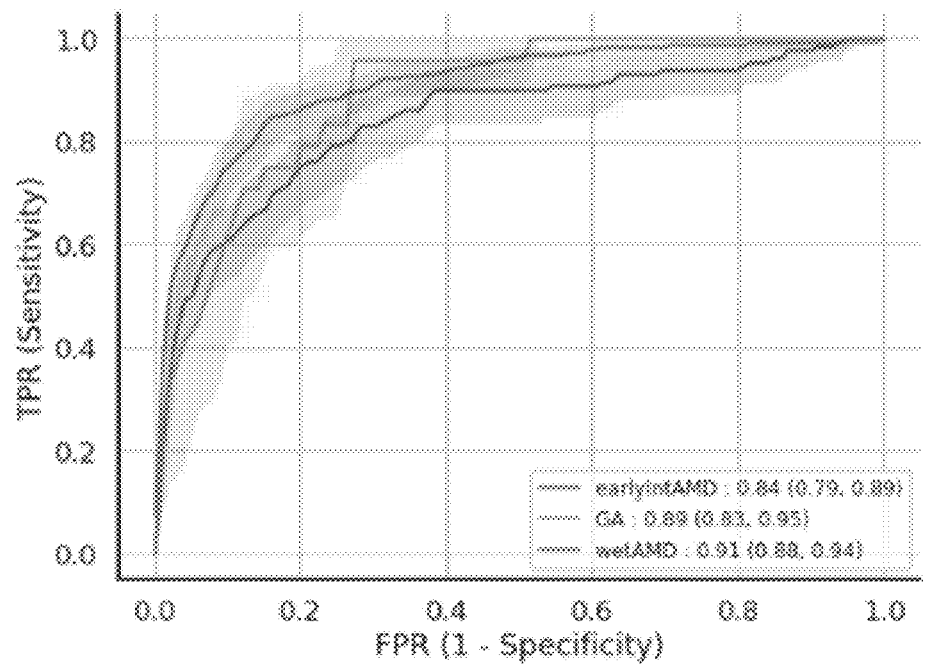
FIGS. 14A and 14B provide the performance of SLIVER-net in terms of Receiver Operating Characteristic (ROC) and Precision-Recall for identifying different manifestations (stages) of AMD
Figure 14B:
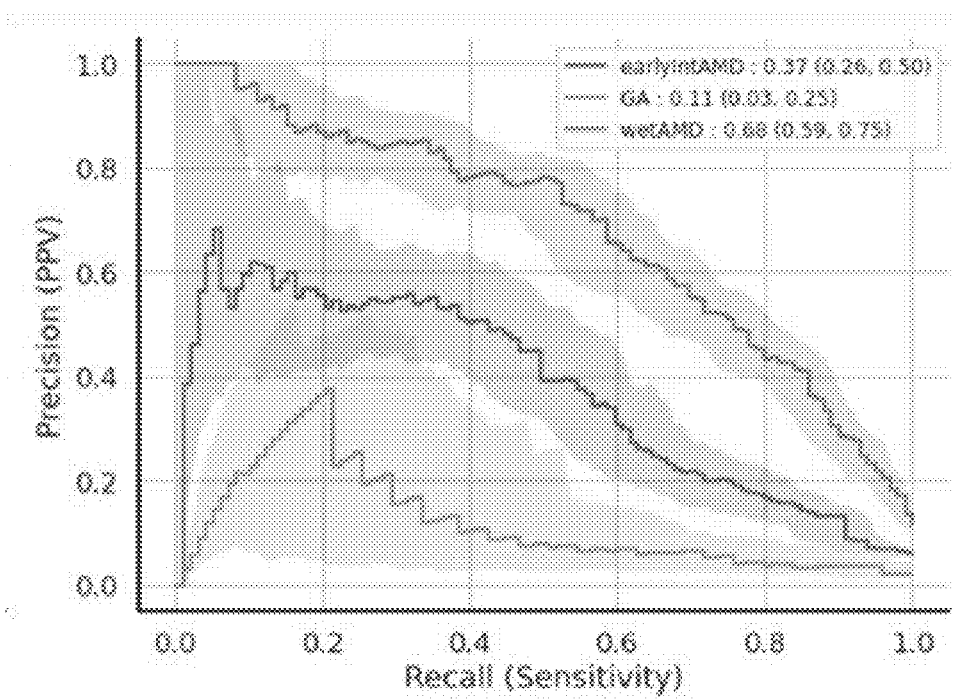

Some embodiments provide detection of AMD subtypes using the deep learning methods. Certain embodiments provide that AMD subtypes include different stages of AMD including (but not limited to) early or intermediate AMD (earlyIntAMD), wet AMD, and geographic atrophy. The performance of SLIVER-net in terms of ROC and precision-recall for identifying different manifestations and/or stages of AMD in accordance with an embodiment of the invention are illustrated in FIGS. 14A and 14B.

EXEMPLARY EMBODIMENTS

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for.

Example 1: Data

Biomarker prediction data. OCT scans were acquired from 984 patients as part of a longitudinal study on AMD progression in the Amish population. These scans were acquired from three different sites: University of Pennsylvania (UPenn: 421), Case Western (Ohio: 173), and University of Miami (Miami: 390) using the Spectralis system. The same specialist reviewed each OCT image for <quality>. Only images that were determined to be good quality were used for model development and validation. Data from Miami and Ohio were used for model training, and data from UPenn were withheld for testing.

Six biomarkers associated with AMD risk, diagnosis, or progression were selected. The presence or absence of these biomarkers were manually recorded for each OCT volume. All three datasets were annotated by the same specialist, and the testing dataset was reviewed by an additional three independent readers.

Transfer learning data. Two external datasets were used to pretrain models. One dataset was ImageNet, which consists of millions of training images comprised of a thousand object categories. (See, e.g., Deng, J. et al. 2009 IEEE Conference on Computer Vision and Pattern Recognition 248-255 (IEEE, 6/2009), the disclosure of which is incorporated herein by reference.) ImageNet has been commonly used in transfer learning applications for natural images, and it is well established that models pre-trained on ImageNet perform well on other domains. (See, e.g., Oquab, M., et al., Proceedings of the IEEE conference on computer vision and pattern recognition 1717-1724 (2014); and Shin, H.-C. et al., IEEE Trans. Med. Imaging 35, 1285-1298 (2016), the disclosures of which are incorporated herein by reference.)

A large collection of publicly available OCT images collected by Kermany et al., 2018, were also collected which are simply refer to as "Kermany". In this dataset, 84,495 foveal images (i.e., the middle slice of each OCT volume) were annotated for one of four conditions: Choroidal neovascularization (CNV), Diabetic Macular Edema (DME) and Drusens. While there were less than 100,000 samples in this dataset, they were more similar to the biomarker prediction data.

Data Preprocessing. Each slice of the volume was resampled from 496×512 pixels to 224×224 pixels. (See, e.g., He, K., Zhang, X., Ren, S. & Sun, J. Deep Residual Learning for Image Recognition. in 2016 IEEE Conference on Computer Vision and Pattern Recognition (CVPR), the disclosure of which is incorporated herein by reference.) Then, image contrast was enhanced by clipping pixel intensities to the 2nd and 98th percentile, and resulting values were rescaled between 0 and 255. The size of the input was also reduced by selecting the middle 51 slices (each of size 224×224), which corresponds to the macula, and observed that manipulating the number of slices did not significantly alter performance.

Example 2: 3D CNNs

Convolutional neural networks comprise out of many kernels that receive an image as input and produce a representation that is most meaningful for a given task using an operation called convolution. 3D CNNs extend this approach to three dimensional objects and are commonly applied to volume analysis. They have gained popularity in biomedical imaging (e.g. CTI, MRI) due to increasingly capable hardware. (See, e.g., He, K., et al., 2016 IEEE Conference on Computer Vision and Pattern Recognition (CVPR) 770-778 (IEEE, 6/2016) Jiang, H., et al., IEEE Access 7, 24898-24909 (2019); and Kamnitsas, K. et al., Med. Image Anal. 36, 61-78 (02/2017), the disclosure of which are incorporated herein by reference.) A 3D version of Resnet1821 was used to compare against the 2D approach. The input to the network was a 3D volume of size 224× 224×51 and the output was a prediction score range 0 to 1 for each biomarker representing the probability the respective biomarker is present.

Example 3: SLIVER-net Architecture

SLIVER-net was comprised of three steps. First, the preprocessed OCT volume was passed through a "backbone" convolutional neural network (CNN), which represented the scan in an abstract feature space. Then, a slice aggregation operation was applied in order to compress this representation. Finally, a decision layer operated on this compressed representation to determine the presence or absence of biomarkers. The primary differences between the performance of models are summarized in FIG. 12, and described in detail below.

Step 1: Backbone networks: CNN models contain several convolutional layers stacked together (i.e., each layer's output serves as the next layer's input) to extract a feature map from a single image. Previous work, has shown that the first CNN layers (lower layers) of a deep learning model generally identify abstract features (lines, edges, corners) and the upper layers identify features that are more task specific. (See, e.g., Yosinski, J., et al., arXiv:1506.06579 [cs] (2015), the disclosure of which is incorporated herein by reference.) In the experiments, all tested models were based on the same CNN architecture, Resnet1821, 2D approaches (SLIVER-net, Tile-RESNET) used 2D kernels (size 3×3, 7×7) while the 3D-CNN approach used 3D kernels (size 3×3×3,7×7×7). Resnet18 was chosen since it has shown to perform well in the natural image setting21. This model represents each 224×224 OCT slice as an 8×8 image. Feature extraction on all 2D slices were computed in one forward pass. To do this, each of the 51 slices was concatenated vertically, forming a "tiled" image of (51×224)×224 image that was passed to the model. The output of the backbone model was a (51×8)×8 image with 1024 features for each of the 51 slices.

Step 2: Slice Integration. In a deep learning model, the final feature map produced by the CNN layers is collapsed into a feature vector, usually by taking the average across all spatial dimensions in an operation referred to as global average pooling. This "flattens" the feature map such that it can be passed to a decision layer. This operation was extended by taking both the maximum ("max pooling") and average ("average pooling"). The Tile-Resnet model was composed of the tiling approach outlined above combined with average and max pooling. The average and maximum were taken across the entire (51×8)×8 backbone output, resulting in a vector of 1×1024 which was passed to the decision layer. However, it was observed that applying this operation globally would remove the model's access to local 3D structure of the OCT volume. In order to preserve correspondence among neighboring slices, average and max pooling was performed within each of the 8×8 backbone outputs, producing a 51×1024 representation of the volume. Then, a small 1D CNN was added to aggregate these slices before they were passed to the decision layer. This Slice Integration procedure was a primary driver of the success of SLIVER-net according to embodiments.

Step 3: Decision layer. A decision layer receives a feature vector as input and produces an output score in the range of 0 to 1 for classification or a real value for regression problems. The Decision layer is a multilayer perceptron (MLP) consisting of three fully connected layers with a rectified linear unit (ReLU) between each layer and a sigmoid activation function as output. (See, e.g., Friedman, J. The Elements of Statistical Learning Data Mining, Inference, and Prediction. (Springer-Verlag New York, 2009); 10.21236/ad0256582. doi:10.21236/ad0256582; Pinkus, A., Acta Numer. 8, 143-195 (1999); and Hara, K., 2015 International Joint Conference on Neural Networks (IJCNN) 1-8 (2015), the disclosures of which are incorporated herein by reference.) The fully connected layers which are linear operations combined with the nonlinearity of the ReLU functions enables the MLP to perform as a universal approximator being able to approximate any function given a sufficient amount of data.

Biomarkers were predicted in a multi-task approach, in which the single network simultaneously predicted the presence of all targets. The prediction "head" consisted of only one hidden layer, feeding to an output layer of 6 units with a sigmoid activation function, corresponding to the biomarkers. By simultaneously optimizing for separate tasks, the multi task paradigm provides an implicit regularization, improving generalizability. (See, e.g., Chen, H., et al., arXiv:1604.02677 [cs] (2016); and Argyriou, A., et al., Multi-Task Feature Learning. in Advances in Neural Information Processing Systems 19 (eds. Schölkopf, B., Platt, J. C. & Hoffman, T.) 41-48 (MIT Press, 2007), the disclosures of which are incorporated herein by reference.)

Example 4: Training

Data acquired from Miami and Ohio were used to develop the models. These data were randomly split into training (80%) and validation (20%) sets. Training was carried out for 50 passes through the training set ("epochs"). For each model, learning rate was chosen using the learning rate finder implemented in the Fastai library. Early stopping was applied in order to prevent overfitting. Once the validation loss stopped decreasing for a period longer than 20 epochs training was stopped and the parameters that achieved the lowest loss on the validation set during training were chosen.

Example 5: Transfer Learning

Model pretraining. One limitation of the Resnet, and other CNN feature extractors is that they require a large amount of data to train. A typical solution to this is to apply transfer learning, in which the network is first trained on an existing but similar dataset, and then "fine-tuned" on the dataset of study. (See, e.g., Pratt, L. Y. Discriminability-Based Transfer between Neural Networks. in *Advances in Neural Information Processing Systems* 5 (eds. Hanson, S. J., Cowan, J. D. & Giles, C. L.) 204-211 (Morgan-Kaufmann, 1993), the disclosure of which is incorporated herein by reference.)

The ImageNet and Kermany datasets were evaluated for their suitability for transfer learning. While ImageNet is a much larger dataset, the set from Kermany et al. consisted of OCT images similar to the data. In both tested datasets, both the task (image classification for ImageNet, and disease diagnosis for Kermany), were not aligned with the biomarker prediction task. However, it has been observed that some convolutional neural networks extract general, low level features. Exemplary embodiments used the following approach to apply transfer learning to biomarker prediction:
1. Exemplary embodiments trained a network for the original task of the auxiliary dataset. For both datasets, a Resnet18 feature extractor was trained for its respective task (object classification or disease classification) for up to 50 epochs (with early stopping) and a learning rate of $1\ e^{-3}$.
2. Exemplary embodiments discarded the decision layers, which were specialized for the auxiliary task.
3. Exemplary embodiments replaced the decision layer with a randomly initialized one appropriate for the target task.
4. Only the new decision layer for biomarker prediction was then trained with the training set without changing any of the parameters in the feature extractor.
5. Finally, the whole network was updated using a reduced learning rate.

DOCTRINE OF EQUIVALENTS

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method to predict retinal disease biomarkers comprising:
    obtaining at least one three-dimensional optical coherent tomography image using a computer system;
    reshaping the three-dimensional optical coherent tomography image into a two-dimensional image by stacking a plurality of slices of said three-dimensional image on top of one another using the computer system;
    applying a pre-trained feature extractor, wherein the pre-trained feature extractor independently operates on each of the plurality of slices;
    applying a convolutional neural network operating across the plurality of slices, wherein the convolutional neural network produces a feature vector; and
    generating an output of biomarker prediction, wherein the prediction is a transformation of the feature vector.

2. The method of claim 1, wherein the final output is at least one biomarker predictive of age-related macular degeneration (AMD), AMD subtype, AMD progression, or AMD deterioration.

3. The method of claim 2, wherein the AMD subtype is selected from the group consisting of early AMD, intermediate AMD, wet AMD, and geographic atrophy.

4. The method of claim 2, wherein the at least one biomarker is intraretinal hyperreflective feature over drusen, intraretinal hyperreflective feature over non drusen, intraretinal cystoid spaces, drusenoid pigment epithelial detachment, subretinal tissue, subretinal drusenoid deposits, incomplete retinal pigment epithelial and outer retinal atrophy (IRORA), complete retinal pigment epithelial and outer retinal atrophy (cRORA), and any combinations thereof.

5. The method of claim 1, further comprising slice pooling by sampling a mean value and a maximum value from every slice.

6. The method of claim 1, wherein the convolutional neural network is a 1D convolutional neural network.

7. The method of claim 1, wherein feature vector transformation is a decision layer comprising at least two fully connected layers.

8. The method of claim 7, wherein the layers are connected with a rectified linear unit between each layer.

* * * * *